United States Patent
Oh et al.

(10) Patent No.: US 11,862,079 B2
(45) Date of Patent: Jan. 2, 2024

(54) DISPLAY DEVICE

(71) Applicant: LG DISPLAY CO., LTD., Seoul (KR)

(72) Inventors: Seung Taek Oh, Paju-si (KR); Dong Gun Lee, Paju-si (KR); Bo Yun Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/990,165

(22) Filed: Nov. 18, 2022

(65) Prior Publication Data
US 2023/0178013 A1    Jun. 8, 2023

(30) Foreign Application Priority Data
Dec. 7, 2021   (KR) .................. 10-2021-0173551

(51) Int. Cl.
*G09G 3/3208*    (2016.01)
*H04N 23/57*    (2023.01)

(52) U.S. Cl.
CPC ........... *G09G 3/3208* (2013.01); *H04N 23/57* (2023.01); *G09G 2310/0289* (2013.01); *G09G 2310/0297* (2013.01); *G09G 2310/08* (2013.01); *G09G 2320/0673* (2013.01); *G09G 2320/0686* (2013.01); *G09G 2330/021* (2013.01)

(58) Field of Classification Search
CPC ...... G09G 3/3648; G09G 3/20; G09G 3/3233; G09G 3/36; G09G 3/2003; G09G 3/3208; G09G 2310/0235; G09G 2310/08; G09G 2320/0673; G09G 2360/144; G09G 2320/0686; G09G 2330/021; G09G 2310/0297; G09G 2300/0452; G09G 2310/0289; H04N 23/57
See application file for complete search history.

(56) References Cited

U.S. PATENT DOCUMENTS

| | | | |
|---|---|---|---|
| 7,142,188 B2 * | 11/2006 | Tsumura | G09G 3/342 349/68 |
| 7,857,458 B2 * | 12/2010 | Fujita | H04N 9/3114 353/46 |
| 9,483,973 B2 * | 11/2016 | Kimura | G09G 3/2074 |
| 9,940,868 B2 * | 4/2018 | Soniwal | G09G 3/2096 |
| 10,012,838 B2 * | 7/2018 | Border | G02B 27/283 |
| 10,222,618 B2 * | 3/2019 | Border | G06F 3/013 |
| 10,347,194 B2 * | 7/2019 | Yashiki | G09G 3/34 |
| 10,410,566 B1 * | 9/2019 | Kerdemelidis | G09G 3/001 |
| 10,777,148 B2 * | 9/2020 | Miyazawa | H04N 5/20 |
| 11,263,984 B2 * | 3/2022 | Miyazawa | G09G 3/3413 |

(Continued)

FOREIGN PATENT DOCUMENTS

| | | | | |
|---|---|---|---|---|
| EP | 3104221 A1 * | 12/2016 | | G09G 3/002 |
| JP | 2007147932 A * | 6/2007 | | G09G 3/3659 |

(Continued)

*Primary Examiner* — Vinh T Lam
(74) *Attorney, Agent, or Firm* — Morgan, Lewis & Bockius LLP

(57) ABSTRACT

A display device includes a display panel including a plurality of pixels, and an image capturing unit disposed below the plurality of pixels, wherein, when the image capturing unit is driven, the display panel is time-divisionally driven by dividing one frame into a plurality of sub-frame sections, and the image capturing unit is synchronized with the display panel to receive different color data for each section of the plurality of sub-frame sections.

20 Claims, 20 Drawing Sheets

(56) References Cited

U.S. PATENT DOCUMENTS

| | | | | |
|---|---|---|---|---|
| 11,463,629 | B2* | 10/2022 | Miyai | H04N 23/743 |
| 11,482,159 | B2* | 10/2022 | Nagao | G03B 17/18 |
| 11,496,726 | B2* | 11/2022 | Deighton | H04N 13/366 |
| 11,640,810 | B2* | 5/2023 | Kim | G09G 5/026 |
| | | | | 345/694 |
| 2009/0244048 | A1* | 10/2009 | Yamanaka | H04N 9/3188 |
| | | | | 345/212 |
| 2013/0169706 | A1* | 7/2013 | Harant | H04N 9/3111 |
| | | | | 345/697 |
| 2016/0259166 | A1* | 9/2016 | Border | G02B 27/0018 |
| 2021/0019921 | A1* | 1/2021 | Yoshida | G03B 17/18 |

FOREIGN PATENT DOCUMENTS

| | | | | |
|---|---|---|---|---|
| JP | 5121136 | B2 * | 1/2013 | G09G 3/3659 |
| WO | WO-2018008720 | A1 * | 1/2018 | |

\* cited by examiner

[FIG. 1]
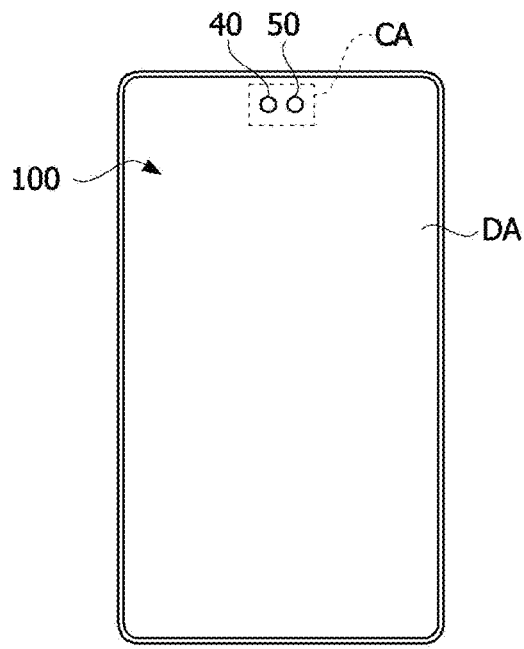
[FIG. 2]
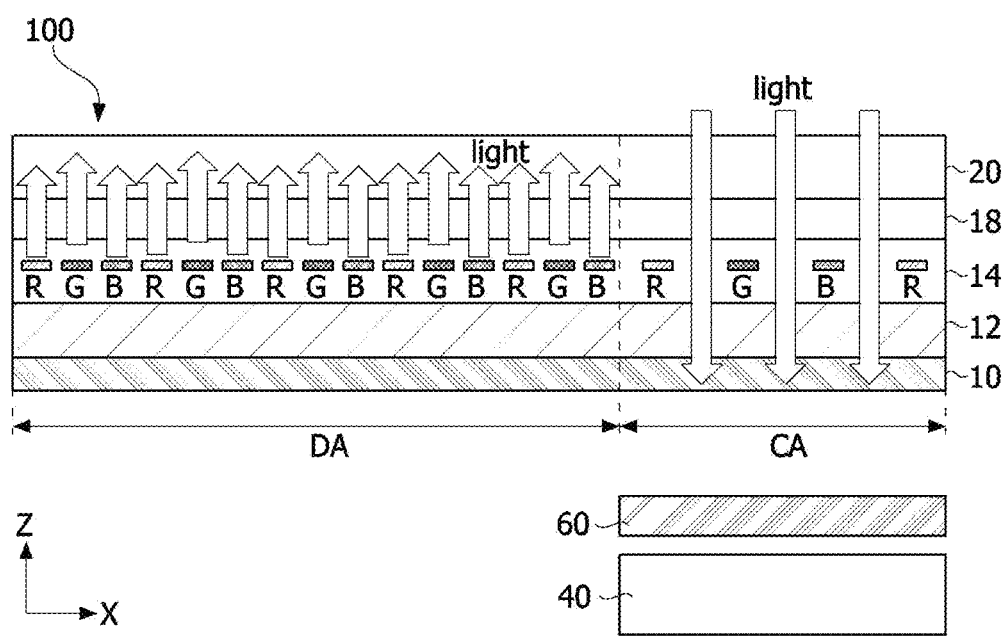

[FIG. 3a]
DA
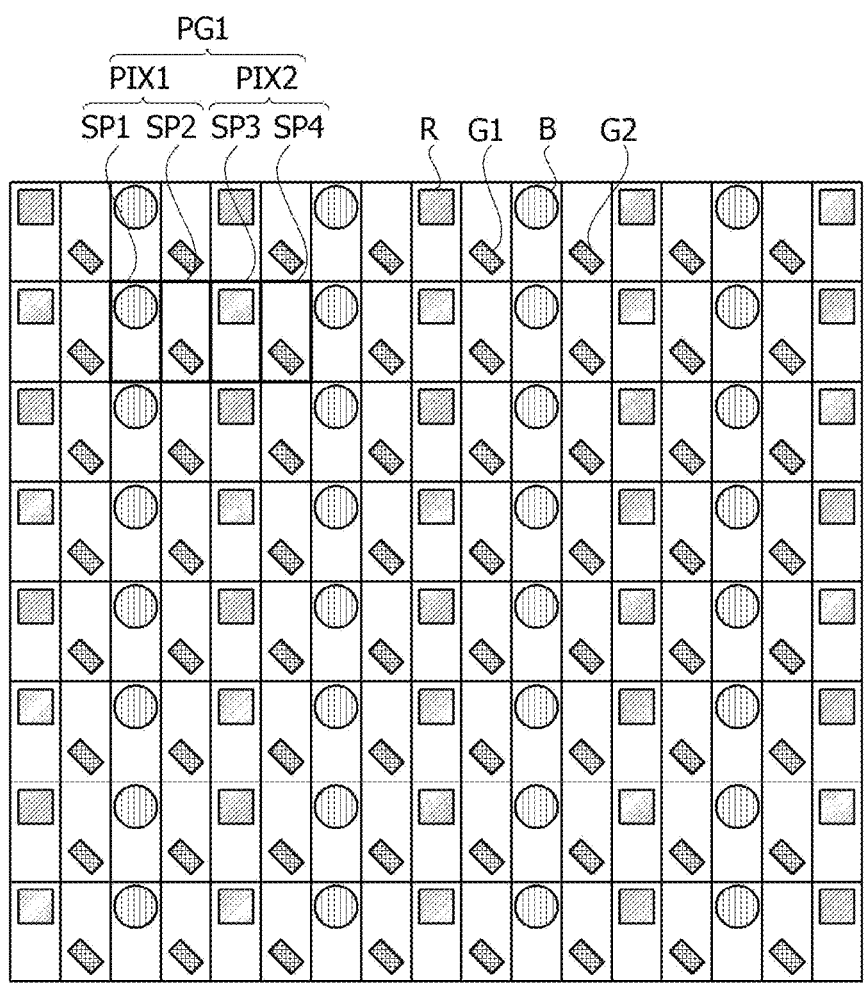

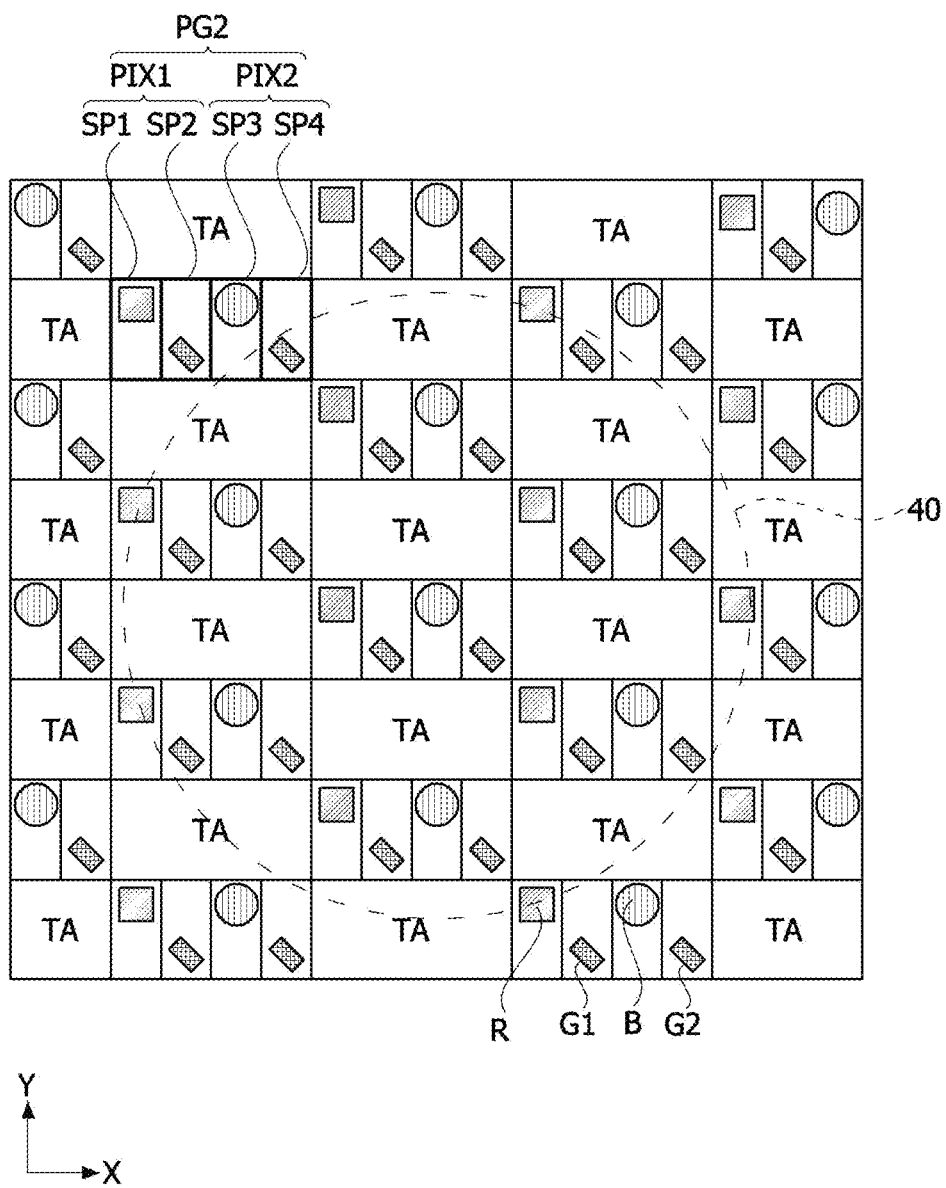
[FIG. 3b]

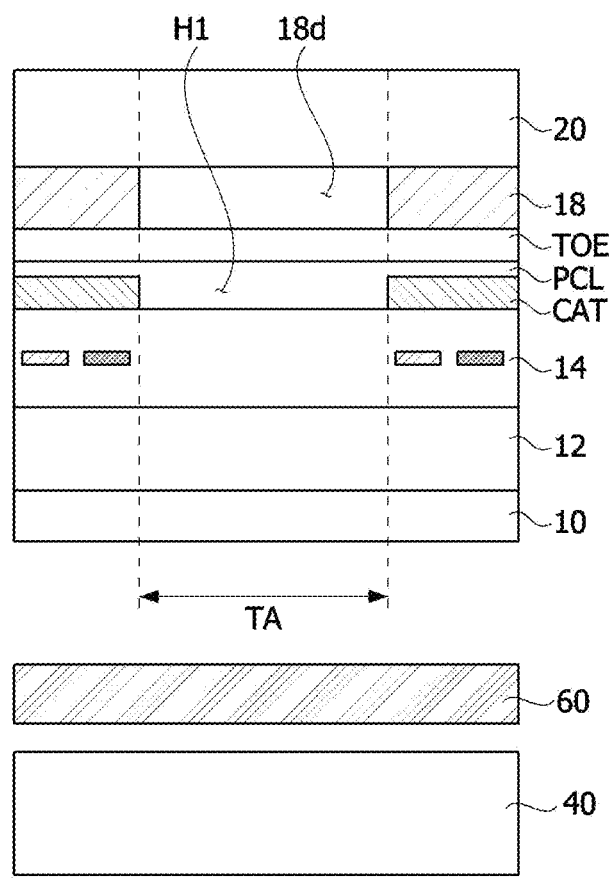
[FIG. 4]

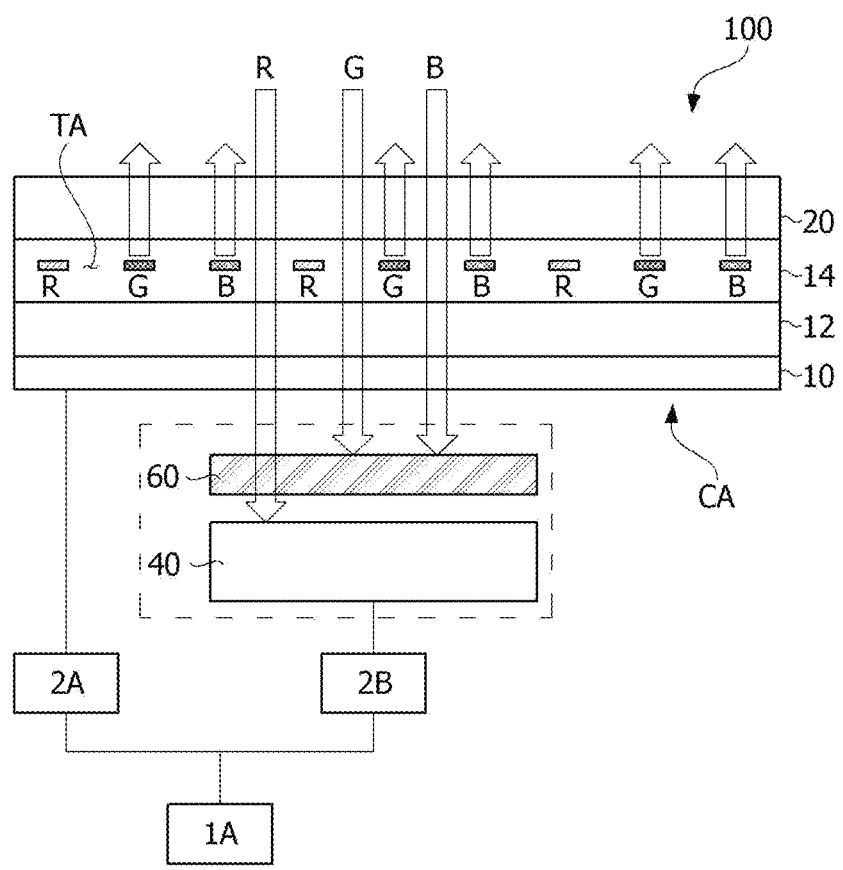
[FIG. 5]

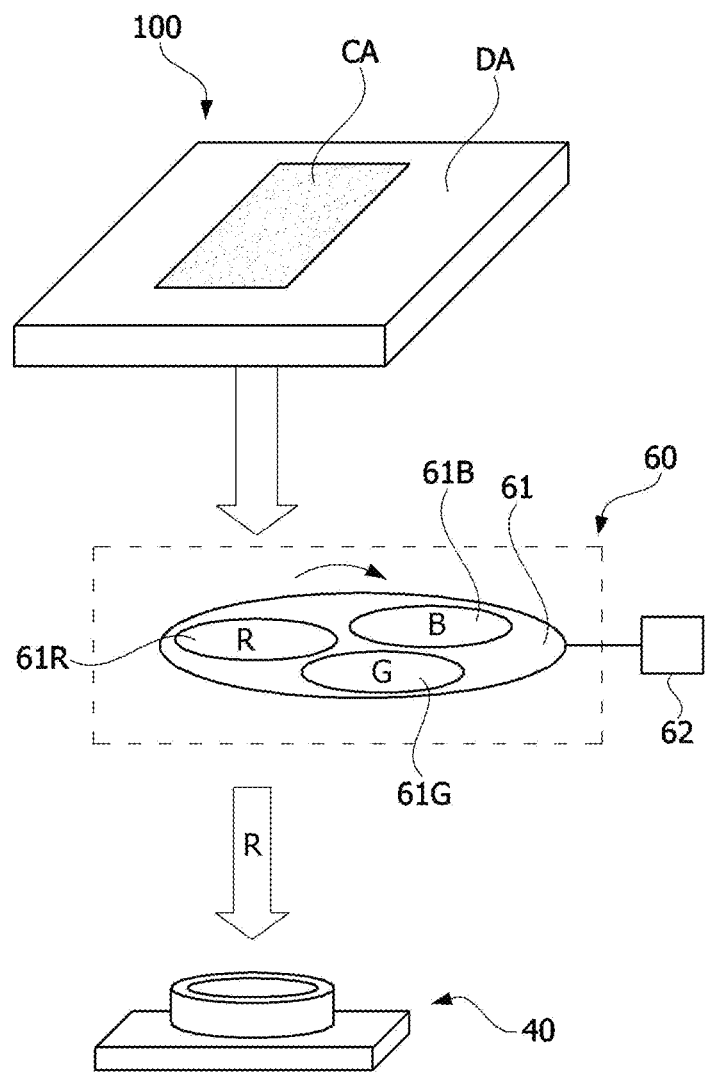

[FIG. 6b]
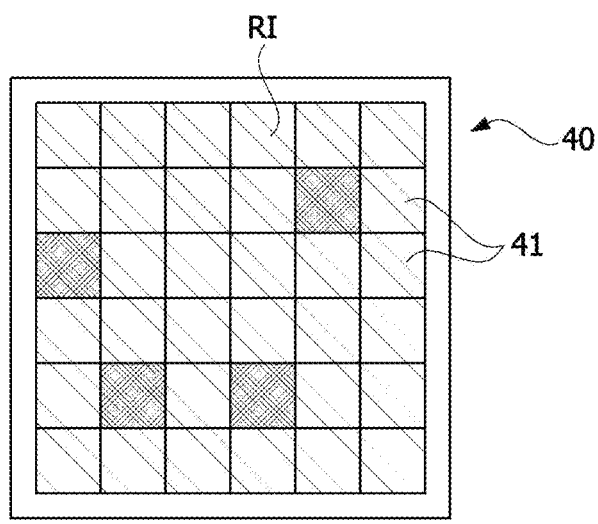

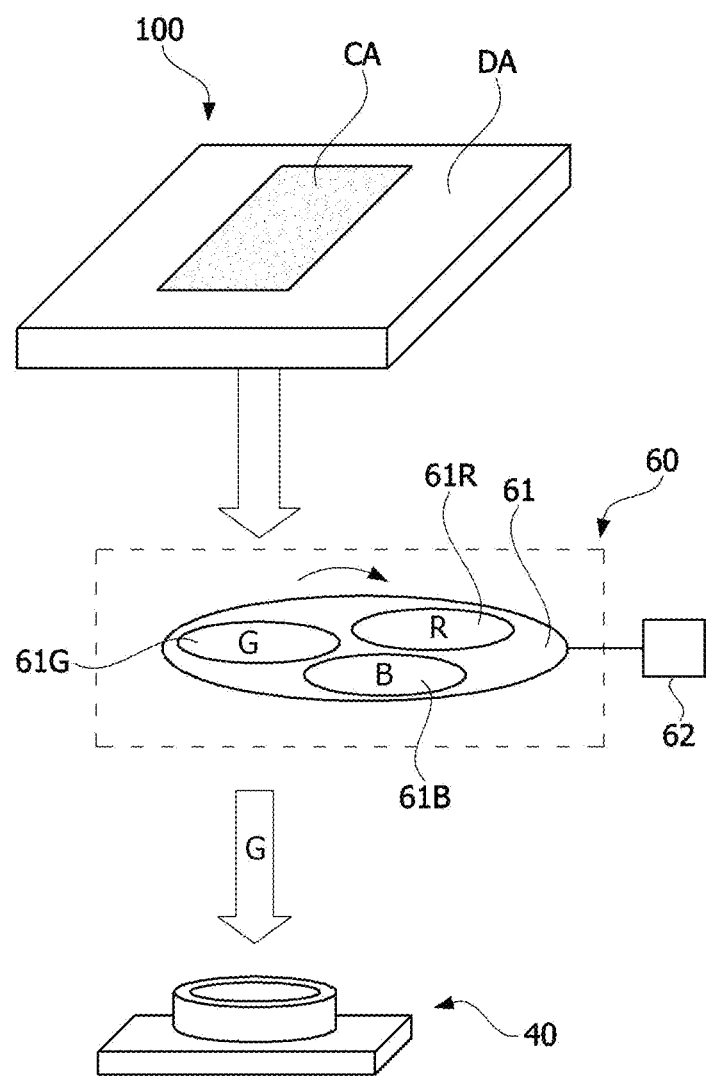
[FIG. 7a]

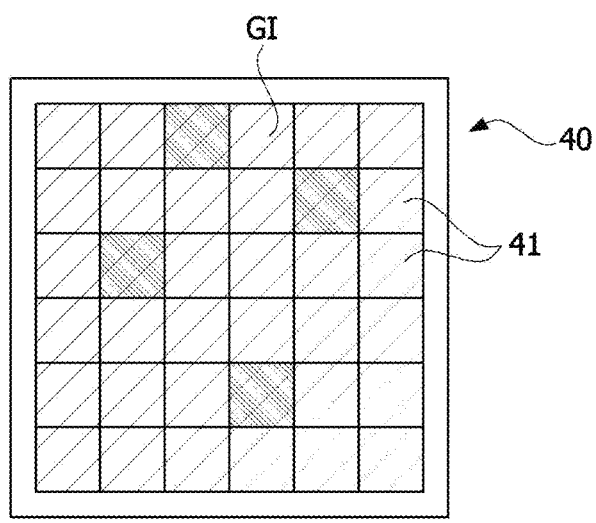
[FIG. 7b]

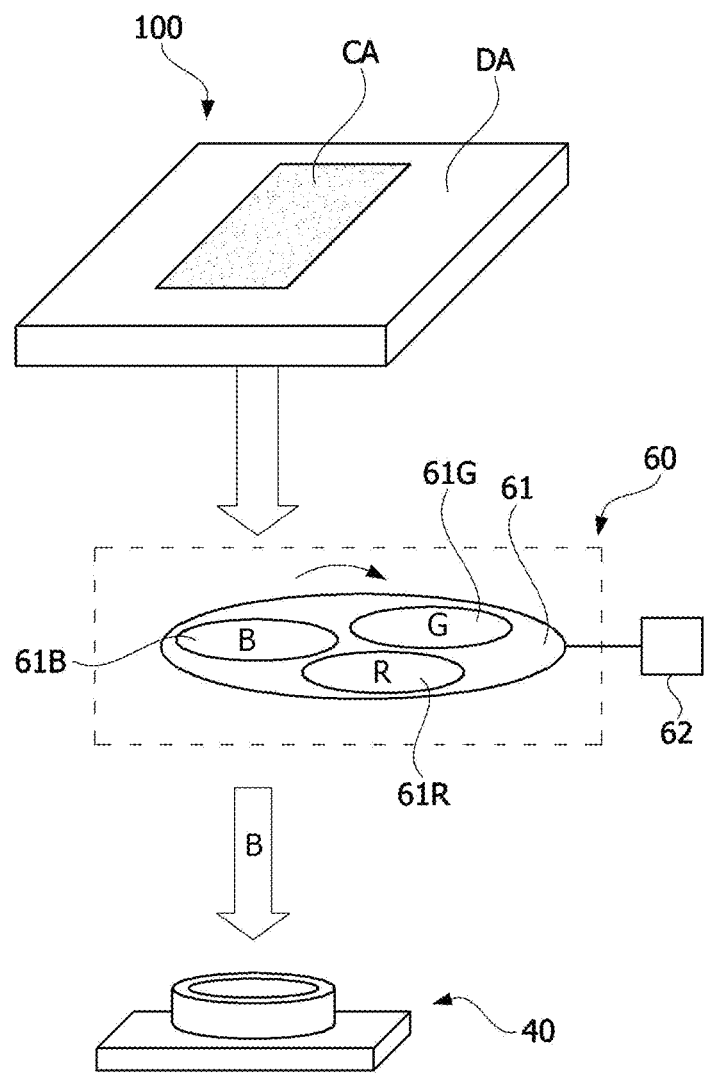
[FIG. 8a]

[FIG. 8b]
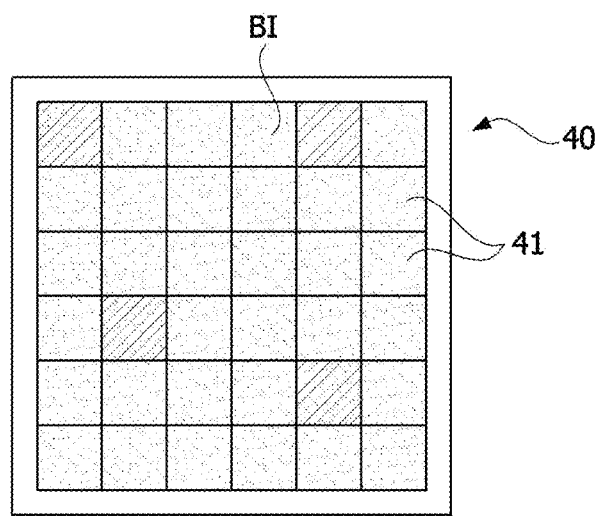
[FIG. 9]
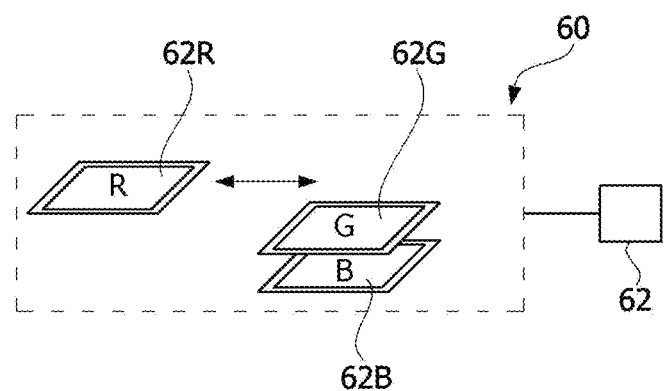

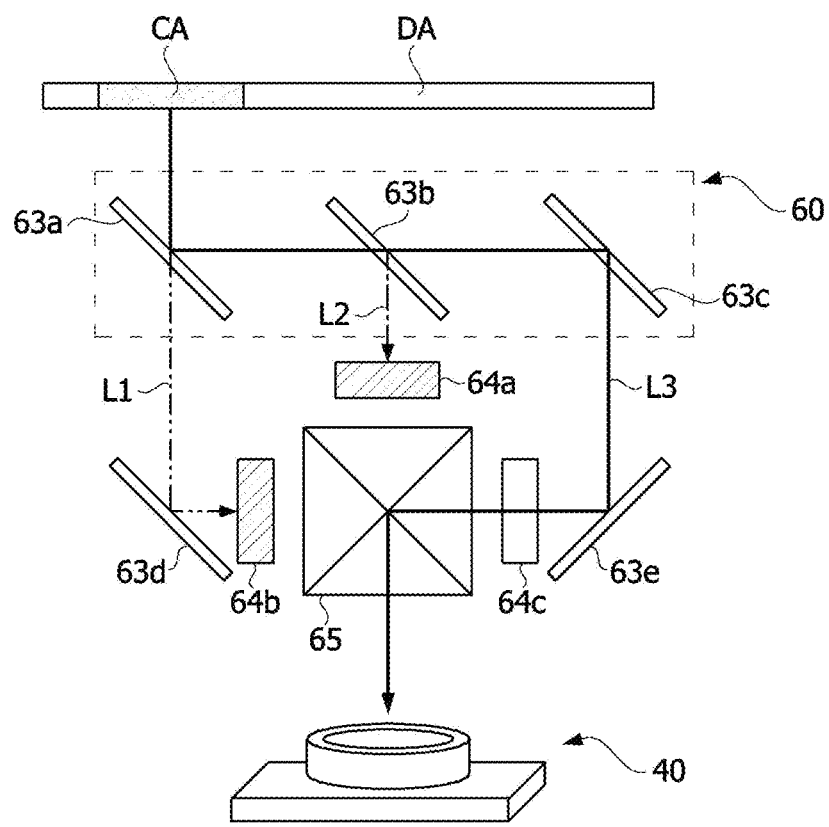
[FIG. 10a]

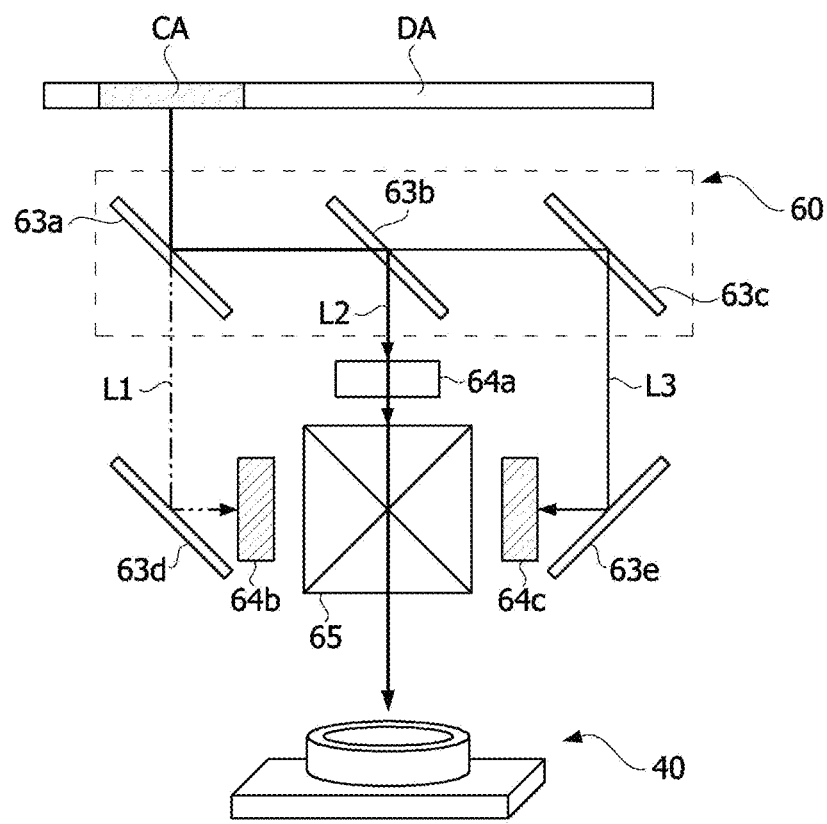
[FIG. 10b]

[FIG. 10c]
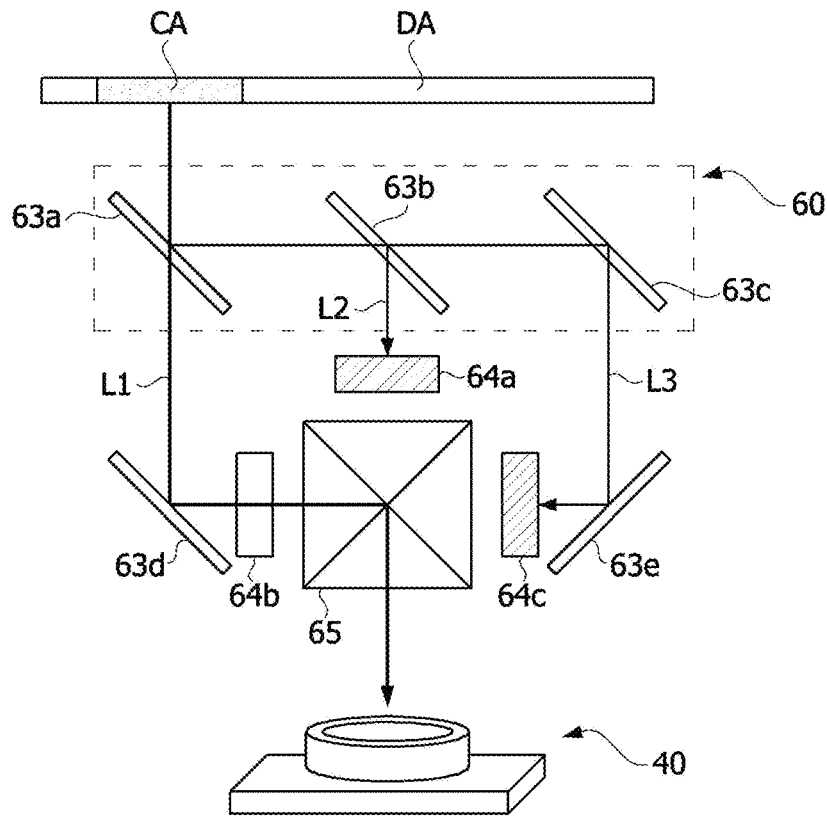
[FIG. 11]
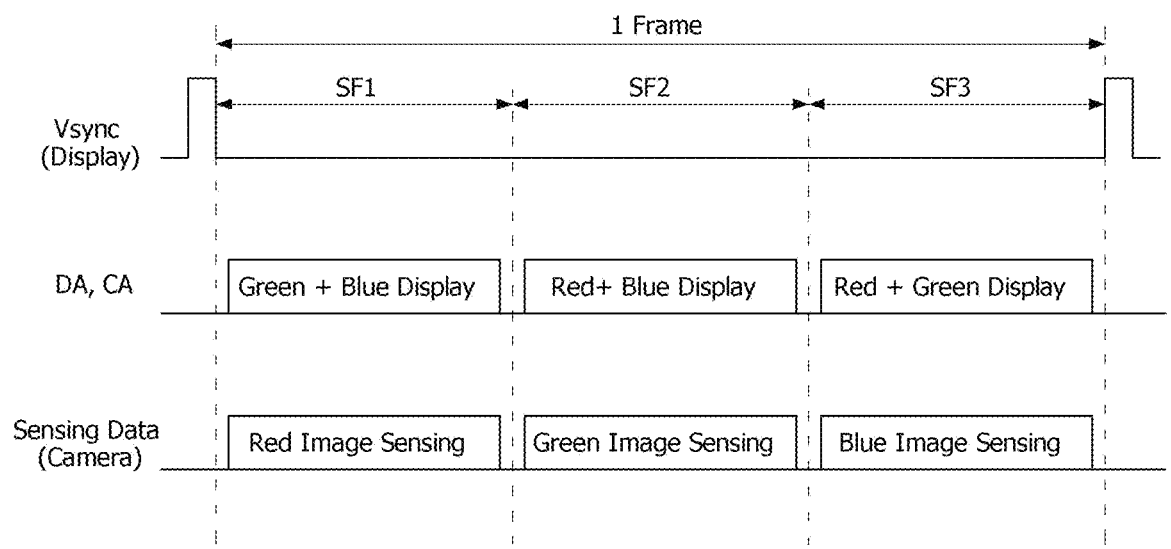

[FIG. 12]
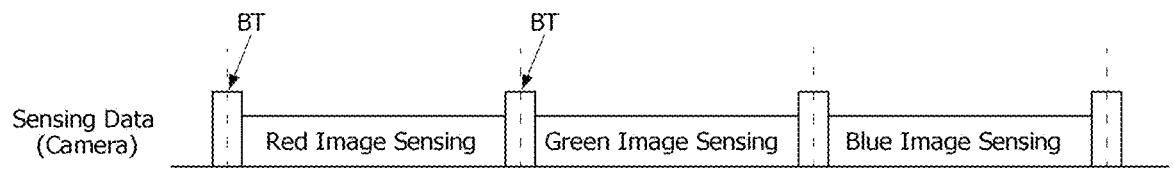
[FIG. 13]
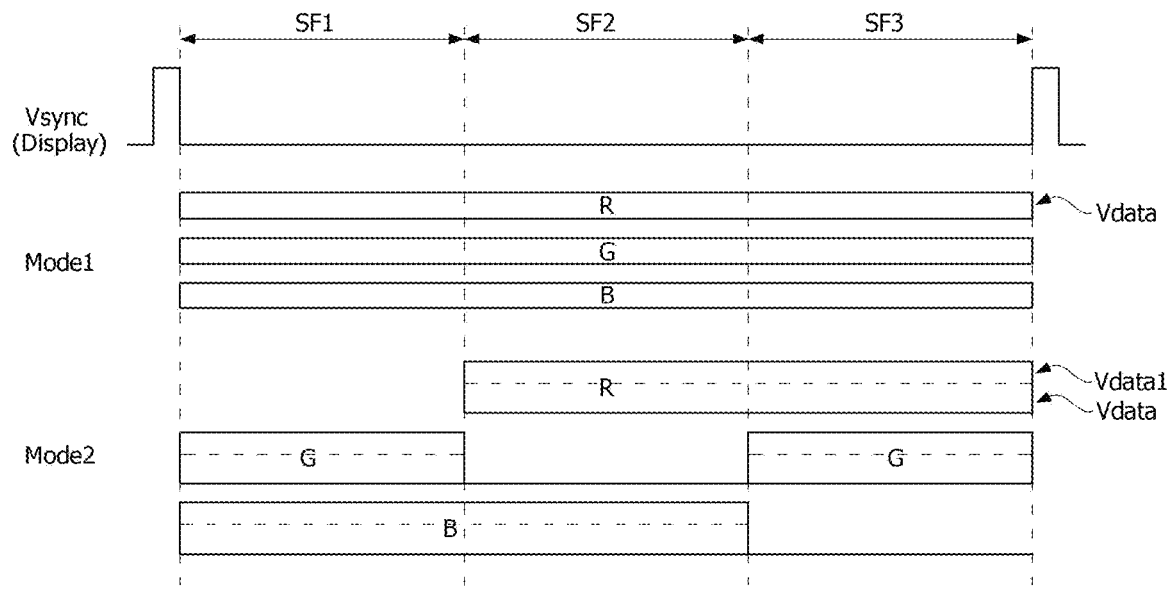
[FIG. 14a]
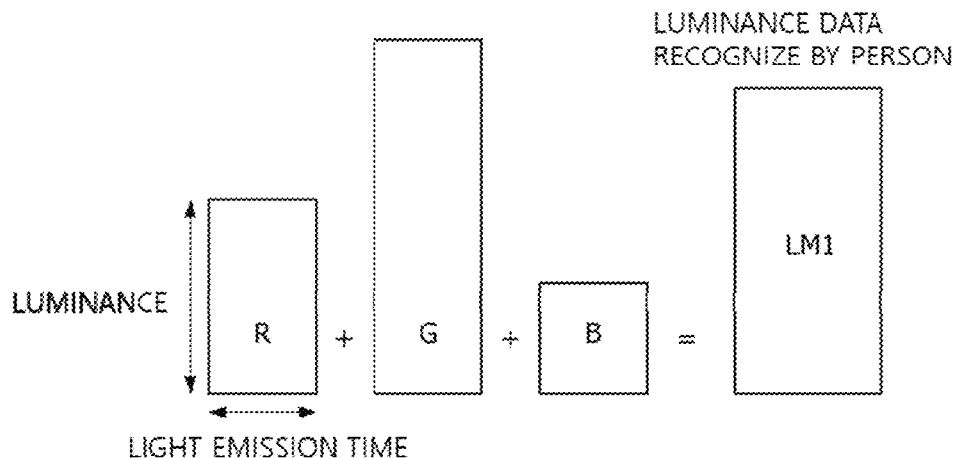

[FIG. 14b]
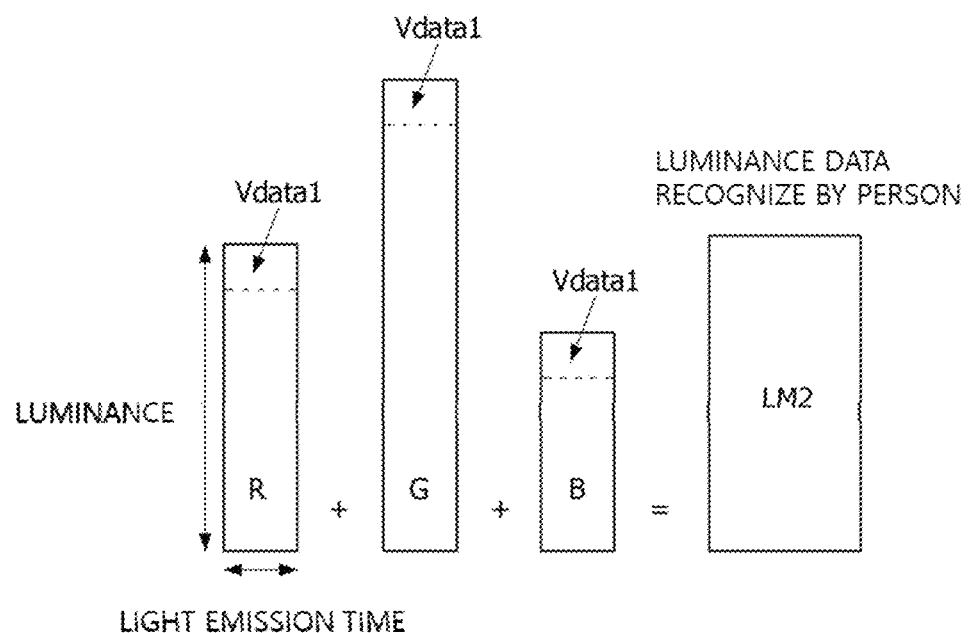

[FIG. 15]
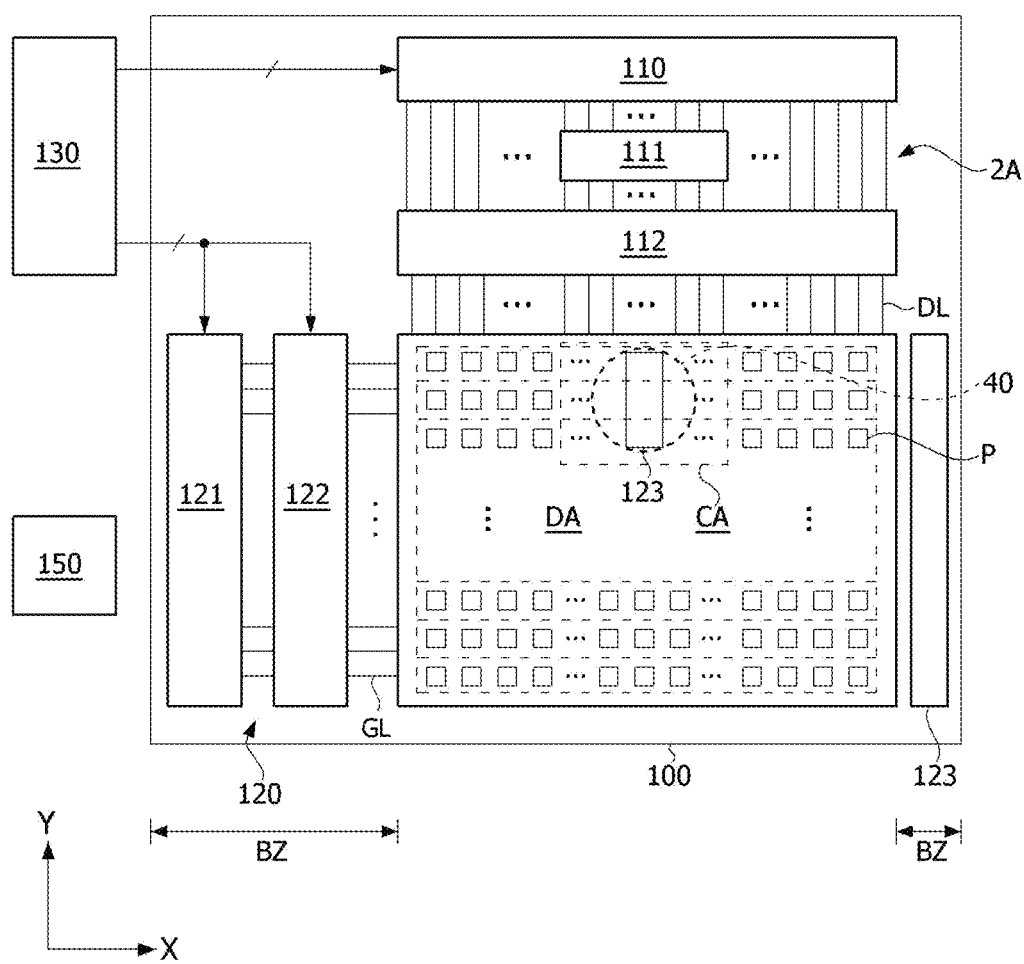

[FIG. 16]
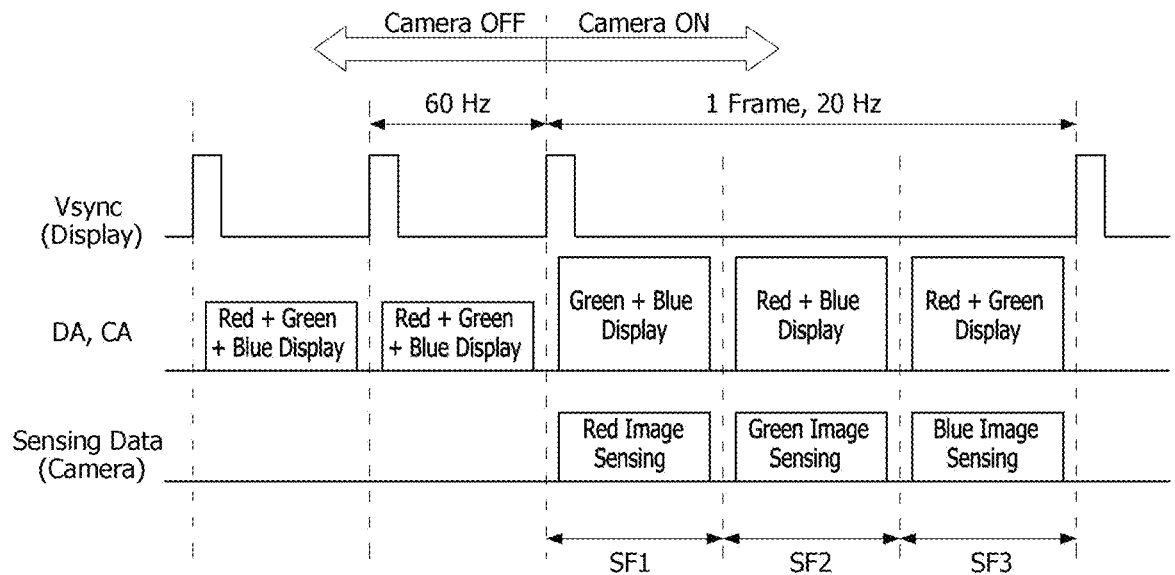
[FIG. 17]
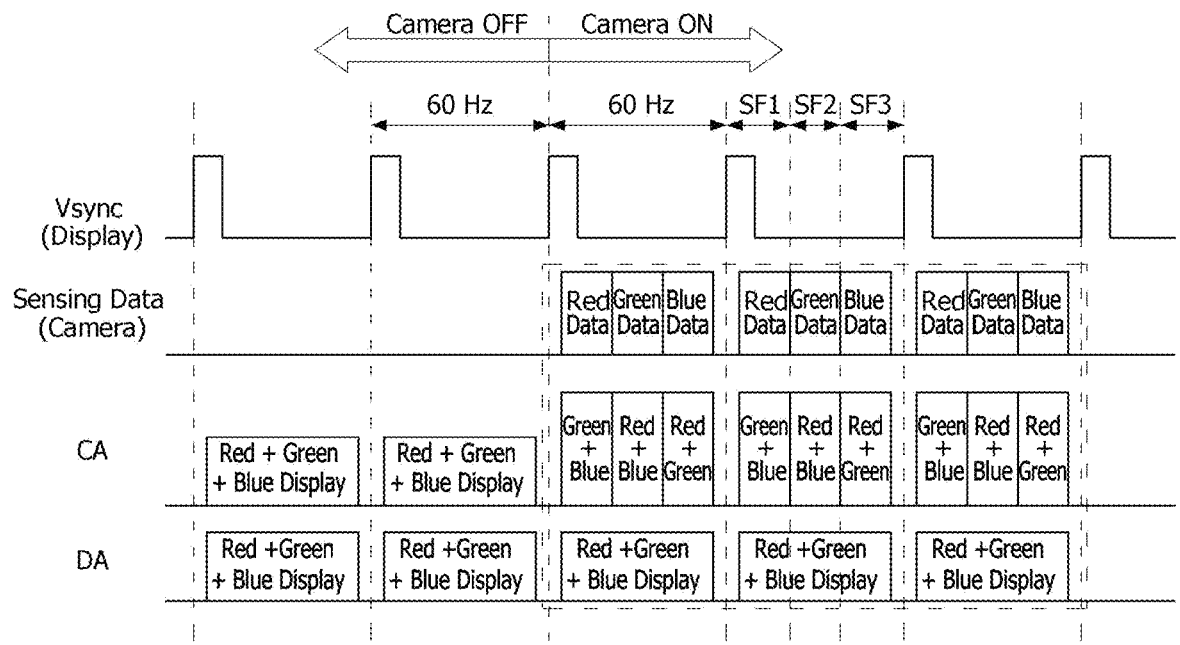

[FIG. 18]
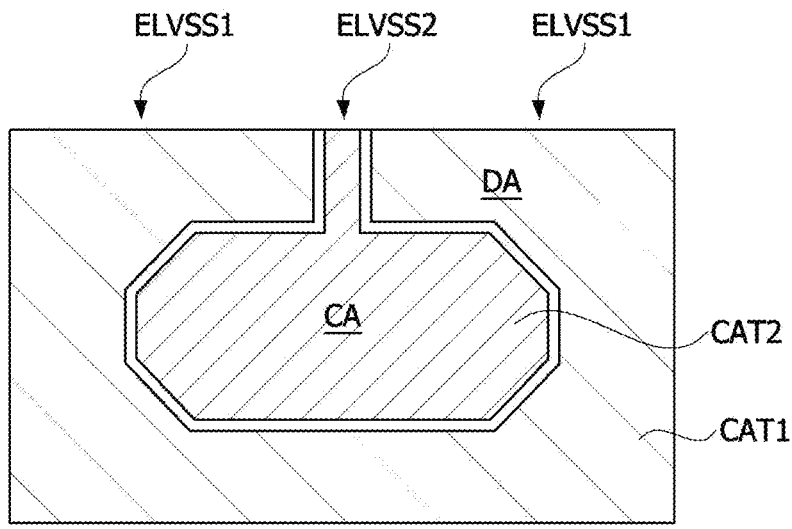
[FIG. 19]
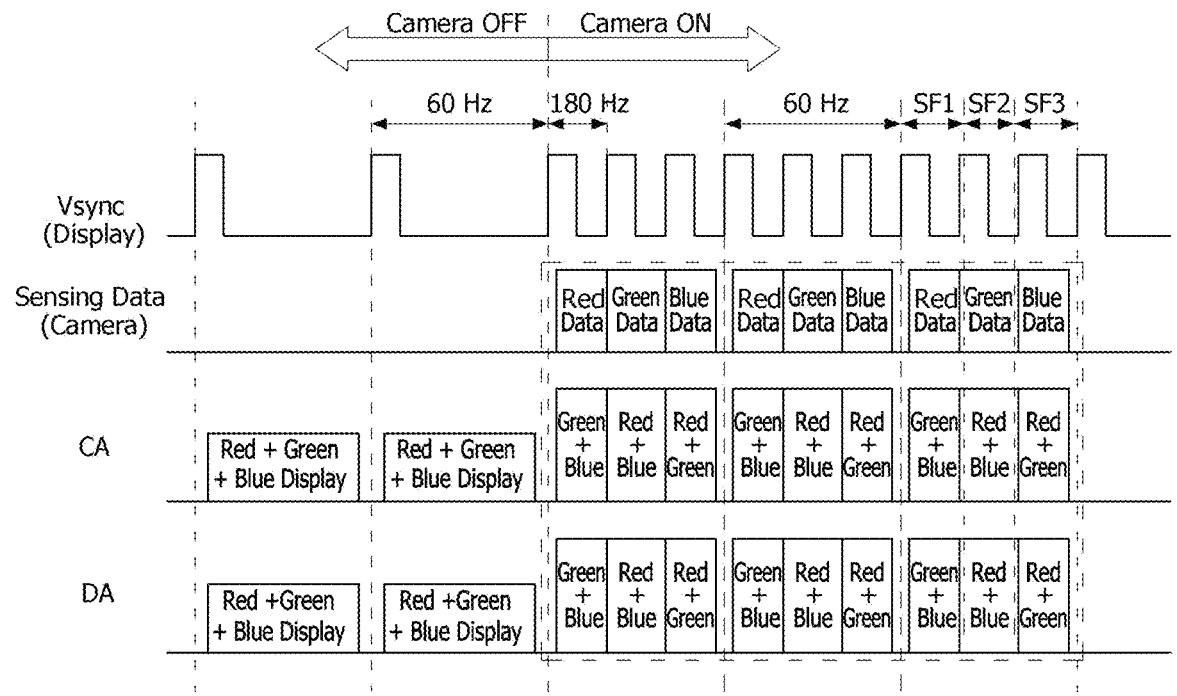

[FIG. 20]
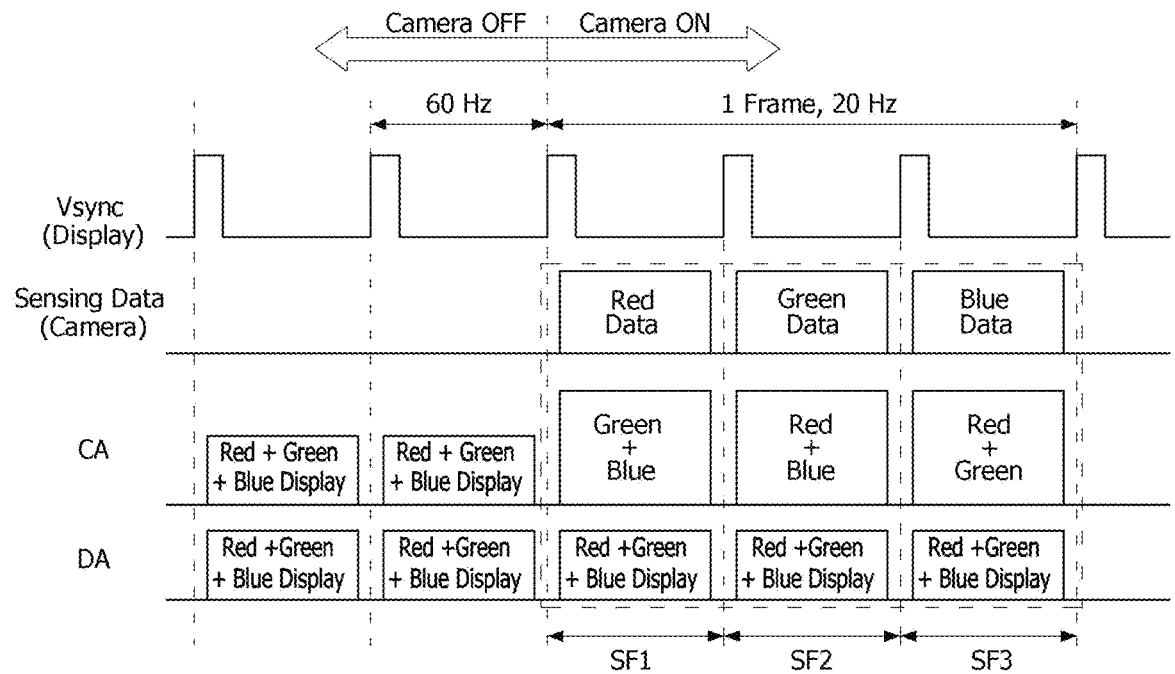
[FIG. 21]
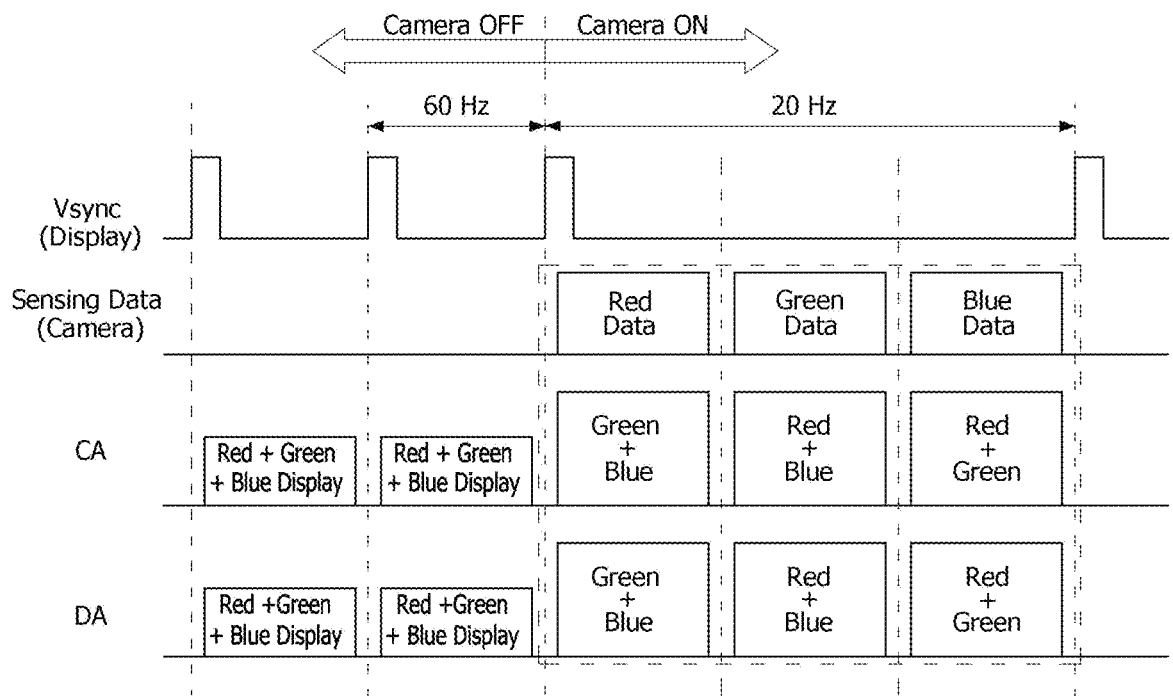

DISPLAY DEVICE

CROSS-REFERENCE TO RELATED APPLICATION

This application claims priority to and the benefit of Korean Patent Application No. 10-2021-0173551, filed on Dec. 7, 2021, the disclosure of which is incorporated herein by reference in its entirety.

BACKGROUND

1. Technical Field

An embodiment relates to a display device.

2. Discussion of the Related Art

Electroluminescence display devices may be classified into inorganic light-emitting display devices and organic light-emitting display devices depending on materials of a light-emitting layer. An active-matrix-type organic light-emitting display device includes an organic light-emitting diode (OLED) that emits light by itself and has advantages of a quick response time, high light emission efficiency, high luminance, and a wide viewing angle. The organic light-emitting display device may have OLEDs formed in each pixel. The organic light-emitting display device may represent a black grayscale as perfect black as well as having a quick response time, high light emission efficiency, high luminance, and a wide viewing angle, and thus have an excellent contrast ratio and color gamut.

Recently, multimedia functions of a mobile terminal have been improved. For example, a camera is basically built in a mobile terminal and the resolution of the camera is increasing to a level of an existing digital camera. However, a front camera of the mobile terminal limits the design of a screen, thereby making it difficult to design the screen. In order to reduce the space occupied by the camera, a screen design including a notch or a punch hole has been adopted in the mobile terminal, but it is difficult to implement a full-screen display because a screen size is still limited due to the camera.

In order to implement a full-screen display, a method of preparing an image capturing area in which low-resolution pixels are disposed in a screen of a display panel, and disposing a camera and/or various sensors in the image capturing area, has been proposed.

SUMMARY

Accordingly, embodiments of the present disclosure are directed to a display device that substantially obviates one or more of the problems due to limitations and disadvantages of the related art.

Aspect of the present disclosure is to provide a display device capable of improving the quality of an image captured by a front camera.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display device comprises a display panel including a plurality of pixels, and an image capturing unit disposed below the plurality of pixels, wherein, when the image capturing unit is driven, the display panel is time-divisionally driven by dividing one frame into a plurality of sub-frame sections, and the image capturing unit is synchronized with the display panel to receive different color data for each section of the plurality of sub-frame sections.

The display panel may include a first display area having a first pixel density and a second display area having a second pixel density lower than the first pixel density, and the image capturing unit may be disposed below the second display area.

In each section of the sub-frame sections, color data output from the display panel may be different from color data received by the image capturing unit.

The display device may include a display panel driving unit configured to drive the display panel, and an image capturing unit driving unit configured to drive the image capturing unit, wherein, when the image capturing unit is driven, the display panel driving unit and the image capturing unit driving unit may be synchronized with each other to time-divisionally drive each of the display panel and the image capturing unit.

The display panel driving unit may adjust a data voltage applied to the pixel during time-division driving to be greater than a data voltage applied to the pixel during normal driving in which the time-division driving is not performed.

The display device may include a filter module configured to allow light to be selectively incident on the image capturing unit, wherein the filter module may include a blue filter, a green filter, and a red filter.

The filter module may allow one of the blue filter, the green filter, and the red filter to be selectively disposed in the second display area for each section of the plurality of sub-frame sections.

The plurality of sub-frame sections may include a first sub-frame section, a second sub-frame section, and a third sub-frame section, wherein in the first sub-frame section, the image capturing unit may receive blue data and the display panel outputs green data and red data, in the second sub-frame section, the image capturing unit may receive the green data and the display panel outputs the blue data and the red data, and, in the third sub-frame section, the image capturing unit may receive the red data and the display panel outputs the blue data and the green data.

When the image capturing unit is driven, a driving frequency for driving the display panel may be varied.

When the image capturing unit is driven, the first display area may be driven in a normal mode in which time-division driving is not performed, and the second display area may be time-divisionally driven.

When the image capturing unit is driven, the first display area may be driven at a first driving frequency, and the second display area may be driven at a second driving frequency different from the first driving frequency.

When the image capturing unit is driven, the first display area may simultaneously output red data, green data, and blue data that constitute an image, and the second display area may simultaneously output only two pieces of data of the red data, the green data, and the blue data for each section of the plurality of sub-frame sections.

The image capturing unit may include a blocking section, in which data is not input, between the plurality of sub-frame sections.

In another aspect, a display device comprises a display panel including a first display area having a first pixel density and a second display area having a second pixel density lower than the first pixel density, an image capturing unit disposed below the second display area, and a filter module configured to allow light to be selectively incident on the image capturing unit, wherein the image capturing unit is time-divisionally controlled to receive different color data by the filter module for each time-division section.

When the image capturing unit is driven, the display panel may be time-divisionally driven by dividing one frame into a plurality of sub-frame sections, and in the plurality of sub-frame sections, color data output from the display panel may be different from color data received by the image capturing unit.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 1 is a conceptual diagram of a display device according to one embodiment of the present disclosure;

FIG. 2 is a cross-sectional view schematically illustrating a display panel according to an embodiment of the present disclosure;

FIG. 3A is a view illustrating a pixel arrangement in a first display area according to one embodiment of the present disclosure;

FIG. 3B is a view illustrating pixels and light-transmitting areas of a second display area;

FIG. 4 is a view schematically illustrating a structure of the display panel of the second display area;

FIG. 5 is a view illustrating a state in which only a portion of light data is selectively incident on an image capturing unit;

FIG. 6A is a view illustrating a state in which only red data is selectively incident on the image capturing unit by a filter module;

FIG. 6B is a view illustrating a state in which the red data is received by a plurality of sensing pixels of the image capturing unit;

FIG. 7A is a view illustrating a state in which only green data is selectively incident on the image capturing unit by the filter module;

FIG. 7B is a view illustrating a state in which the green data is received by the plurality of sensing pixels of the image capturing unit;

FIG. 8A is a view illustrating a state in which only blue data is selectively incident on the image capturing unit by the filter module;

FIG. 8B is a view illustrating a state in which the blue data is received by the plurality of sensing pixels of the image capturing unit;

FIG. 9 illustrates a first modified example of the filter module;

FIGS. 10A to 10C illustrate a second modified example of the filter module;

FIG. 11 is a view illustrating time-division driving of the display panel and the image capturing unit;

FIG. 12 is a view illustrating a driving timing having a light blocking section in which sensing data is not incident on the image capturing unit;

FIG. 13 is a view illustrating a difference between data voltages applied during normal driving and time-division driving of the display panel;

FIG. 14A is a view illustrating a data voltage applied to the pixel of the second display area in the normal driving and luminance;

FIG. 14B is a view illustrating a data voltage applied to the pixel of the second display area in the time-division driving and luminance;

FIG. 15 is a block diagram of a display device according to an embodiment of the present disclosure;

FIG. 16 is a view illustrating driving timings during normal driving and time-division driving of the display panel;

FIG. 17 is a view illustrating driving timings of the image capturing unit, the first display area, and the second display area;

FIG. 18 is a view illustrating a state in which a cathode of the first display area and a cathode of the second display area are separated;

FIG. 19 illustrates a first modified example of FIG. 17;

FIG. 20 illustrates a second modified example of FIG. 17; and

FIG. 21 illustrates a third modified example of FIG. 17.

DETAILED DESCRIPTION

Advantages and features of the present disclosure and implementation methods thereof will be clarified through the following embodiments described with reference to the accompanying drawings. However, the present disclosure is not limited to the embodiments described below and may be embodied with a variety of different modifications. The embodiments are merely provided to allow those skilled in the art to completely understand the scope of the present disclosure, and the present disclosure is defined only by the scope of the claims.

The figures, dimensions, ratios, angles, numbers, and the like disclosed in the drawings for describing the embodiments of the present disclosure are merely illustrative and are not limited to matters shown in the present disclosure. Like reference numerals throughout the specification can refer to like elements. In the description of the present disclosure, a detailed description of known techniques related to the present disclosure may be omitted when it is determined that it may obscure the subject matter of the present disclosure.

Terms such as "including," "having," and "composed of" used herein are intended to allow other elements to be added unless the terms are used with the term "only." Any references to the singular may include the plural unless expressly stated otherwise.

Components may be interpreted to include an ordinary error range even if not expressly stated.

For description of a positional relationship, for example, when the positional relationship between two parts is described as "on," "above," "below," and "next to," etc., one or more parts may be interposed therebetween unless the term "immediately" or "directly" is used in the expression.

In the description of embodiments, the terms "first," "second," and the like may be used herein to describe various components, the components are not limited by the terms. These terms are used only to distinguish one component from another. Accordingly, a first component discussed below could be termed a second component without departing from the teachings of the present disclosure.

Like reference numerals throughout the specification can refer to like elements.

The features of various embodiments may be partially or entirely bonded to or combined with each other. The embodiments may be interoperated and performed in technically various ways and may be carried out independently of or in association with each other.

Hereinafter, various embodiments of the present disclosure will be described in detail with reference to the accompanying drawings.

FIG. 1 is a conceptual diagram of a display device according to one embodiment of the present disclosure. FIG. 2 is a cross-sectional view schematically illustrating a display panel according to an embodiment of the present disclosure. FIG. 3A is a view illustrating a pixel arrangement in a first display area according to one embodiment of the present disclosure.

Referring to FIG. 1, the display device includes a display panel 100, and a front surface of the display panel 100 may be configured as a display area. Thus, a full-screen display may be implemented. The display device may be a display panel itself and may be a concept including a display panel and a driving unit.

The display area may include a first display area DA and a second display area CA. The first display area DA and the second display area CA may all output an image but may be different in resolution. As an example, a resolution of a plurality of second pixels disposed in the second display area CA may be lower than a resolution of a plurality of first pixels disposed in the first display area DA. A relatively large amount of light may be injected into sensors 40 and 50 disposed in the second display area CA by as much as the resolution lowered in the plurality of second pixels disposed in the second display area CA.

However, the present disclosure is not necessarily limited thereto, and the resolution of the first display area DA and the resolution of the second display area CA may be the same as long as the second display area CA may have sufficient light transmittance or an appropriate compensation algorithm may be implemented.

The second display area CA may be an area in which the sensors 40 and 50 are disposed. The second display area CA is an area that overlaps various sensors and thus may be smaller in area than the first display area DA outputting most of the image.

The second display area CA is illustrated as being disposed on an upper end of the display device, but the present disclosure is not necessarily limited thereto. The position and area of the second display area CA may be variously modified.

The sensors 40 and 50 may include at least one of an image sensor, a proximity sensor, an illumination sensor, a gesture sensor, a motion sensor, a fingerprint recognition sensor, and a biometric sensor. As an example, a first sensor may be an illumination sensor or an infrared sensor and a second sensor may be an image sensor configured to capture an image or a video, but the present disclosure is not necessarily limited thereto.

Referring to FIGS. 2 and 3A, the first display area DA and the second display area CA may include a pixel array in which pixels, to which pixel data is written, are disposed. The number of pixels per unit area (hereinafter, referred to as "pixels per inch (PPI)") of the second display area CA may be lower than that of the first display area DA in order to ensure the light transmittance of the second display area CA.

The pixel array of the first display area DA may include a pixel area in which a plurality of pixel groups having a high PPI are disposed. The pixel array of the second display area CA may include a pixel area in which a plurality of pixel groups having a relatively low PPI are disposed by being spaced apart from each other by light-transmitting areas. In the second display area CA, external light may pass through the display panel 100 through the light-transmitting areas having high light transmittance and may be received by a sensor placed below the display panel 100.

Since both the first display area DA and the second display area CA include the pixels, an input image may be reproduced on the first display area DA and the second display area CA. Thus, a full-screen display may be implemented.

Each of the pixels of the first display area DA and the second display area CA may include sub-pixels having different colors to implement a color of an image. The sub-pixels may include red, green, and blue sub-pixels. Although not shown in the drawings, the pixel group may further include a white sub-pixel. Each of the sub-pixels may include a pixel circuit unit and a light-emitting element (e.g., organic light-emitting diode: OLED).

The second display area CA may include the pixels and an image capturing unit 40 disposed below a screen of the display panel 100. The image capturing unit 40 may include an image sensor. The pixels of the second display area CA may display an input image by writing pixel data of the input image in a display mode.

The image capturing unit 40 may capture an external image in an image capturing mode to output a picture or video image data. The image capturing unit 40 may be a camera module that captures an external image to output a picture or video image data, but is not necessarily limited thereto, and may have various structures capable of acquiring an image.

A filter module 60 may be disposed above the image capturing unit 40. The filter module 60 may selectively pass light incident on the second display area.

In order to ensure light transmittance, due to the pixels being removed from the second display area CA, an image quality compensation algorithm for compensating luminance and color coordinates of the pixels in the second display area CA may be applied.

The display panel 100 may have a width in an X-axis direction, a length in a Y-axis direction, and a thickness in a Z-axis direction. The display panel 100 may include a circuit layer 12 disposed on a substrate 10, and a light-emitting element layer 14 disposed on the circuit layer 12. A polarizing plate 18 may be disposed on the light-emitting element layer 14, and a cover glass 20 may be disposed on the polarizing plate 18.

The circuit layer 12 may include a pixel circuit connected to lines such as data lines, gate lines, power lines, and the like, a gate driving unit connected to the gate lines, and the like.

The circuit layer 12 may include a circuit element such as a transistor implemented as a thin-film transistor (TFT), a capacitor, and the like. The lines and circuit elements of the circuit layer 12 may be implemented with a plurality of insulating layers, two or more metal layers separated from each other with the insulating layers therebetween, and an active layer including a semiconductor material.

The light-emitting element layer 14 may include the light-emitting element driven by the pixel circuit. The light-emitting element may be implemented as an OLED. The OLED may include an organic compound layer formed between an anode and a cathode.

The organic compound layer may include a hole injection layer HIL, a hole transport layer HTL, an emission layer EML, an electron transport layer ETL, and an electron injection layer EIL, but the present disclosure is not limited thereto.

When a voltage is applied to the anode and the cathode of the OLED, holes passing through the hole transport layer HTL and electrons passing through the electron transport layer ETL move to the emission layer EML to create excitons, and thus visible light may be emitted from the emission layer EML.

The light-emitting element layer 14 may further include a color filter array that selectively transmits light of red, green, and blue wavelengths.

The light-emitting element layer 14 may be covered by a protective film, and the protective film may be covered by an encapsulation layer. The protective film and the encapsulation layer may have a structure in which organic films and inorganic films are alternately stacked. The inorganic films may block the penetration of moisture or oxygen. The organic films may planarize a surface of the inorganic film. When the organic films and the inorganic films are stacked in multiple layers, the penetration of moisture/oxygen affecting the light-emitting element layer 14 may be effectively blocked since a movement path of the moisture or oxygen is increased in length as compared with a single layer.

The polarizing plate 18 may be disposed on the encapsulation layer. The polarizing plate 18 can improve outdoor visibility of the display device. The polarizing plate 18 may reduce the reflection of light from a surface of the display panel 100 and block the light reflected from metal of the circuit layer 12, thereby improving the brightness of the pixels. The polarizing plate 18 may be implemented as a polarizing plate to which a linear polarizing plate and a phase retardation film are bonded, or a circular polarizing plate.

Referring to FIG. 3A, the first display area DA may include a plurality of first pixel groups PG1 arranged in a matrix form. In the plurality of first pixel groups PG1, two sub-pixels may form one pixel using a sub-pixel rendering algorithm. For example, a first unit pixel PIX1 may include R and G1 sub-pixels SP1 and SP2, and a second unit pixel PIX2 may include B and G2 sub-pixels SP3 and SP4. Insufficient color representation in each of the unit pixels PIX1 and PIX2 may be compensated with an average value of pieces of corresponding color data between neighboring pixels. However, the present disclosure is not necessarily limited thereto, and each of the plurality of first pixel groups PG1 may be real-type pixels including R, G, and B sub-pixels.

FIG. 3B is a view illustrating pixels and light-transmitting areas of the second display area according to one embodiment of the present disclosure.

Referring to FIG. 3B, the second display area CA may include a plurality of second pixel groups PG2 and a plurality of light-transmitting areas TA. The plurality of light-transmitting areas TA may be disposed between the plurality of second pixel groups PG2. Specifically, each of the light-transmitting areas TA and the second pixel groups PG2 may be alternately disposed in a first direction and a second direction. External light may be received by the image capturing unit 40 through the light-transmitting areas TA. A resolution of the second display area CA may decrease relative to a resolution of the first display area DA by the extent to which an area of the light-transmitting area TA increases. The light-transmitting area TA may include transparent media having high light transmittance without having metal so that light may be incident with small or minimum light loss. The light-transmitting area TA may be made of transparent insulating materials without including metal lines or pixels. As the light-transmitting area TA becomes larger, the light transmittance of the second display area CA may be higher.

Each of the plurality of second pixel groups PG2 may include one or two pixels. For example, in each of the second pixel groups PG2, a first unit pixel PIX1 may include R and G1 sub-pixels SP1 and SP2, and a second unit pixel PIX2 may include B and G2 sub-pixels SP3 and SP4. The shape and arrangement of pixels of the second pixel group PG2 may be the same as or different from those of the first pixel group PG1.

The shape of the light-transmitting area TA is illustrated as being a quadrangular shape, but the present disclosure is not limited thereto. For example, the light-transmitting area TA may be designed in various shapes such as a circular shape, an elliptical shape, a polygonal shape, or the like.

All metal electrode materials may be removed from the light-transmitting area TA. Accordingly, lines of the pixels may be disposed outside the light-transmitting area TA. Thus, light may be effectively incident through the light-transmitting area. However, the present disclosure is not necessarily limited thereto, and the metal electrode material may be present in a partial area of the light-transmitting area TA.

FIG. 4 is a view schematically illustrating a structure of the display panel of the second display area.

Referring to FIG. 4, the display panel may include the circuit layer 12 disposed on the substrate 10, and the light-emitting element layer 14 disposed on the circuit layer 12. The polarizing plate 18 may be disposed on the light-emitting element layer 14, and the cover glass 20 may be disposed on the polarizing plate 18.

In the polarizing plate 18, a first light-transmitting pattern 18d may be formed in an area corresponding to the light-transmitting area TA. Based on green light having a wavelength of 555 nm, a light transmittance of the substrate made of PI is about 70% to 80%, and a light transmittance of the cathode is 80% to 90%. On the other hand, a light transmittance of the polarizing plate 18 is relatively very low to about 40%. Thus, in order to effectively increase the light transmittance in the light-transmitting area, it is necessary to increase the light transmittance of the polarizing plate 18.

The polarizing plate 18 according to the embodiment has the first light-transmitting pattern 18d formed above the light-transmitting area TA to improve light transmittance. The light transmittance of the area in which the first light-transmitting pattern is formed may be the highest in the polarizing plate.

The first light-transmitting pattern 18d of the polarizing plate 18 may be formed by removing a portion of the polarizing plate 18 and may also be formed by decomposing a compound constituting the polarizing plate 18. That is, the first light-transmitting pattern 18d may have various structures capable of increasing the light transmittance of the conventional polarizing plate 18.

In the light-transmitting area TA, the polarizing plate 18 may have the first light-transmitting pattern 18d, and a cathode CAT may have a second light-transmitting pattern.

The second light-transmitting pattern may be an opening H1 formed in the light-transmitting area TA. Since the light transmittance of the cathode is 80% to 90%, the light transmittance of the light-transmitting area TA may be further increased due to the opening H1.

The method of forming the opening H1 in the cathode CAT is not particularly limited. As an example, after the cathode is formed, the opening H1 may be formed in the cathode using an etching process, or the cathode may be removed using a laser at a lower portion of the substrate 10.

A planarization layer PCL may be formed on the cathode CAT, and a touch sensor TOE may be disposed on the planarization layer PCL. Here, in the light-transmitting area TA, a sensing electrode and lines of the touch sensor may be made of a transparent material such as indium tin oxide (ITO) or a metal mesh, thereby increasing light transmittance. In another example, a sensing electrode and lines of the touch sensor may be disposed outside the light-transmitting area TA, and may not be disposed within the light-transmitting area TA.

The image capturing unit 40 may be disposed below the first light-transmitting pattern 18d and/or the opening H1 and may increase the amount of incident light. The filter module 60 may be disposed above the image capturing unit 40. The filter module 60 may selectively pass light incident on the image capturing unit 40.

FIG. 5 is a view illustrating a state in which only a portion of light data is selectively incident on the image capturing unit.

Referring to FIG. 5, the image capturing unit 40 may be disposed below the second display area CA of the display panel 100. However, the image capturing unit 40 may also be disposed below the first display area DA. According to the embodiment, since a plurality of pixels are disposed above the image capturing unit 40, data about light incident from the outside may be relatively insufficient.

Accordingly, an operation of extracting insufficient image data using a Bayer filter and an algorithm may be performed. However, for such a configuration, a high resolution image sensor may be required, and a calculation amount may be increased in the process of extracting insufficient image data using an algorithm.

In general, data about light incident from the outside may include blue data, green data, and red data. The filter module 60 may selectively pass light data incident on the image capturing unit 40.

The configuration of the filter module 60 is not particularly limited. As an example, the filter module 60 may include various types of filters capable of selectively passing the blue data, the green data, and the red data.

A host system 1A of the display device may control a display panel driving unit 2A and an image capturing unit driving unit 2B to synchronize the display panel 100 and the image capturing unit 40 when the image capturing unit 40 is driven, and to time-divisionally drive each of the display panel 100 and the image capturing unit 40.

The image capturing unit driving unit 2B may drive the image capturing unit 40 and the filter module 60 according to a timing signal received from the host system 1A. The host system may be a main circuit board of a television system, a camera, a set-top box, a navigation system, a personal computer (PC), a vehicle system, a home theater system, a mobile device, or a wearable device.

The display panel 100 may be synchronized with the image capturing unit 40 and time-divisionally controlled so that color data incident on the image capturing unit 40 is not output. As an example, when the color data incident on the image capturing unit 40 is red data in a specific time-division section, the display panel 100 may output only green data and blue data and may not output the red data. That is, the display panel driving unit 2A may cause only a green pixel and a blue pixel to emit light, and cause a red pixel not to emit light. Accordingly, the problem of image distortion caused by light output from the display panel 100 being introduced into the image capturing unit 40 may be prevented.

When a conventional Bayer filter is used, each of sensing pixels constituting the image sensor may receive only one of blue, green, and red color data. As an example, one sensing pixel may receive only the blue data, and the green and red data may be calculated through a post-processing process. Thus, there is a problem that an image sensor having a high resolution should be used.

On the other hand, according to an embodiment, the blue, green, and red data may all be incident on one sensing pixel. Accordingly, compared to the conventional Bayer filter, the resolution may be increased three times or more.

FIG. 6A is a view illustrating a state in which only red data is selectively incident on the image capturing unit by the filter module. FIG. 6B is a view illustrating a state in which the red data is received by a plurality of sensing pixels of the image capturing unit. FIG. 7A is a view illustrating a state in which only green data is selectively incident on the image capturing unit by the filter module. FIG. 7B is a view illustrating a state in which the green data is received by the plurality of sensing pixels of the image capturing unit. FIG. 8A is a view illustrating a state in which only blue data is selectively incident on the image capturing unit by the filter module. FIG. 8B is a view illustrating a state in which the blue data is received by the plurality of sensing pixels of the image capturing unit.

Referring to FIG. 6A, the filter module 60 may include a filter array 61 in which a red filter 61R, a green filter 61G, and a blue filter 61B are disposed, and a driving unit 62 configured to rotate the filter array 61. The filter module 60 is disposed below the second display area CA so that various shutter structures capable of replacing the filter for each time-division section are applied without limitation.

The red filter 61R of the filter module 60 may be rotated by the driving unit 62 and disposed below the second display area CA. Accordingly, only the red data among the light data incident on the second display area CA may pass through the filter module 60 to be incident on the image capturing unit 40.

Referring to FIG. 6B, the red data may be written to each of a plurality of sensing pixels 41 of the image capturing unit 40. The plurality of sensing pixels may be a unit pixel of a charge-coupled device (CCD) or complementary metal oxide semiconductor (CMOS) image sensor. An input value RI of the red data written to each of the plurality of sensing pixels 41 may be different according to color of an implemented image. A dark-colored portion in the drawing may be an area having a relatively large data value.

Referring to FIG. 7A, when the green filter 61G of the filter module 60 is disposed below the second display area CA, only the green data among the light data incident on the second display area CA may pass through the filter module 60 to be incident on the image capturing unit 40. Accordingly, as shown in FIG. 7B, the green data may be written to each of the plurality of sensing pixels 41 of the image sensor. An input value GI of the green data written to each of the plurality of sensing pixels 41 may be different according to the color of the implemented image. A dark-colored portion in the drawing may be an area having a relatively large data value.

Referring to FIG. 8A, when the blue filter 61B of the filter module 60 is disposed below the second display area CA, only the blue data among the light data incident on the second display area CA may pass through the filter module 60 to be incident on the image capturing unit 40. Accordingly, as shown in FIG. 8B, the blue data may be written to each of the plurality of sensing pixels 41 of the image sensor. An input value BI of the blue data written to each of the plurality of sensing pixels 41 may be different according to the color of the implemented image. A dark-colored portion in the drawing may be an area having a relatively large data value.

According to this configuration, each of the sensing pixels 41 constituting the image sensor may receive all of the red data, the green data, and the blue data. Accordingly, each sensing pixel may increase the resolution as compared to the Bayer filter capable of receiving only one of the red data, the green data, and the blue data.

An image synthesizing unit (not shown) may synthesize the red data, the green data, and the blue data sequentially output from the image capturing unit 40 to generate one image.

FIG. 9 illustrates a first modified example of the filter module. FIGS. 10A to 10C illustrate a second modified example of the filter module.

Referring to FIG. 9, the filter module 60 may be configured as a stacked color filter. In the stacked color filter, the red filter 62R, the green filter 62G, and the blue filter 62B may be disposed by being stacked and may be sequentially disposed below the second display area CA by the driving unit 62. Accordingly, light data may be selectively incident on the image capturing unit 40 by a plurality of filters.

Referring to FIGS. 10A to 10C, the filter module 60 may include a plurality of splitters and a plurality of shutters. Accordingly, the light incident on the second display area CA may be separated into a plurality of pieces of light by the plurality of splitters depending on wavelengths thereof.

As an example, referring to FIG. 10A, of the incident light, only first light L1 may be transmitted through a first splitter 63a, and second light L2 and third light L3 may be reflected by the first splitter 63a.

The second light L2 may be reflected by a second splitter 63b and the third light L3 may be transmitted therethrough. In addition, the third light L3 may be reflected by a first reflective plate 63c and a second reflective plate 63e so that a path thereof may be changed.

When a first shutter 64b and a second shutter 64a are closed, and a third shutter 64c is open, the third light L3 may be incident on and reflected by a multi-reflective plate 65 and incident on the image capturing unit 40. The first light may be the red data, the second light may be the green data, and the third light may be the blue data.

Referring to FIG. 10B, when the first shutter 64b and the third shutter 64c are closed, and the second shutter 64a is open, the second light L2 may pass through the multi-reflective plate 65 to be incident on the image capturing unit 40.

Referring to FIG. 10C, when the second shutter 64a and the third shutter 64c are closed, and the first shutter 64b is open, the first light L1 may be incident on and reflected by the multi-reflective plate 65 to be incident on the image capturing unit 40.

For the configuration of allowing the light to be selectively incident on the image capturing unit 40 as described above, various structures may be applied without limitation. Alternatively, the filter module 60 may have a form that is embedded in the image capturing unit 40 and mechanically or electrically driven.

FIG. 11 is a view illustrating time-division driving of the display panel and the image capturing unit. FIG. 12 is a view illustrating a driving timing having a light blocking section in which sensing data is not incident on the image capturing unit.

Referring to FIG. 11, when the image capturing unit 40 is driven, the display panel 100 and the image capturing unit 40 may be synchronized with each other and may each be time-divisionally driven. One frame may be divided into a plurality of sub-frames SF1, SF2, and SF3, and the image capturing unit 40 may receive different color data for each section in the plurality of sub-frames SF1, SF2, and SF3.

As an example, the plurality of sub-frames SF1, SF2, and SF3 may include a first sub-frame SF1, a second sub-frame SF2, and a third sub-frame SF3. In a section of the first sub-frame SF1, the image capturing unit 40 may sense the red data and the display panel 100 may output the green data and the blue data.

Similarly, in the second sub-frame SF2, the image capturing unit 40 may sense the green data using the filter module 60, and the display panel 100 may output the red data and the blue data. Further, in the third sub-frame SF3, the image capturing unit 40 may sense the blue data and the display panel 100 may output the red data and the green data. That is, the display panel 100 may simultaneously output only two pieces of data from among the red data, the green data, and the blue data for each sub-frame section.

According to this configuration, the image data output from the display panel 100 may be prevented from being introduced into the image capturing unit 40 by the filter module 60, thereby preventing color mixing. Accordingly, the image quality of an image generated by the image capturing unit 40 may be improved by preventing noise caused by image data emitted from the display panel 100.

In the embodiment, the method in which one frame is divided into three blocks and the three blocks are time-divisionally driven is exemplified, but the number of block sections may be variously modified.

Referring to FIG. 12, a blocking section BT during which data is not introduced may be included in the section between the plurality of sub-frames in consideration of a time for which the filter module 60 moves the filter. Accordingly, noise may be blocked by preventing data from being introduced in the section between the plurality of sub-frames. The blocking section BT may be implemented by closing the shutter of the image capturing unit 40, but various methods capable of forming the blocking section may be applied without limitation.

FIG. 13 is a view illustrating a difference between data voltages applied during normal driving and time-division driving of the display panel. FIG. 14A is a view illustrating a data voltage applied to the pixel in the normal driving and luminance. FIG. 14B is a view illustrating a data voltage applied to the pixel in the time-division driving and luminance.

Referring to FIG. 13, when the image capturing unit 40 is not driven, the display panel 100 may operate in a normal mode in which time-division driving is not performed, whereas when the image capturing unit 40 is driven, the display panel 100 may perform the time-division driving. Both the first display area DA and the second display area CA of the display panel 100 may be time-divisionally driven, but the present disclosure is not necessarily limited thereto, and only the second display area CA may be time-divisionally driven.

In the normal mode (MODE 1), color data necessary to implement one still image may be continuously output during one frame section. In a time-division mode (MODE 2), color data necessary to implement one still image may be divided for each section of the plurality of sub-frames SF1, SF2, and SF3 and output.

Accordingly, in the time-division mode, since the necessary color data is not output in some sub-frame sections, luminance may be smaller than that in the normal mode.

Accordingly, in the embodiment, in the time-division mode, a voltage increment Vdata1 for compensating for the non-output section is added to a data voltage Vdata, which is applied to each pixel in the normal mode, and the summed voltage is applied to the pixel so that the overall luminance may be controlled in the same manner as in the normal mode.

Referring to FIGS. 14A and 14B, in the time-division driving, a range of the data voltage is increased by the extent to which a light emission time of each pixel is reduced, so that it is possible to compensate for the luminance. Accordingly, a user may recognize that luminance LM1 in the normal driving and luminance LM2 in the time-division driving are the same.

FIG. 15 is a block diagram of a display device according to an embodiment of the present disclosure.

Referring to FIG. 15, the display device according to the embodiment of the present disclosure may include a display panel 100, a display panel driving unit 2A for writing pixel data of an input image to pixels P of the display panel 100, a timing controller 130 for controlling the display panel driving unit, and a power supply unit 150 for generating power required for driving the display panel 100.

The display panel 100 may include a pixel array that displays the input image on a screen. As described above, the pixel array may be divided into a first display area DA, and a second display area CA having a resolution or PPI lower than that of the first display area DA.

Since the first display area DA includes the pixels P of high PPI and thus is larger in size than the second display area CA, most of image information is displayed on the first display area DA. An image capturing unit overlapping the second display area CA may be disposed in a lower portion of the display panel 100.

Touch sensors may be disposed on the screen of the display panel 100. The touch sensors may be disposed on the screen of the display panel in an on-cell type or an add-on type, or may be implemented as in-cell type touch sensors that are embedded in the pixel array.

The display panel 100 may be implemented as a flexible display panel in which the pixels P are disposed on a flexible substrate such as a plastic substrate, a metal substrate, or the like. In a flexible display, the size and shape of the screen may be varied by a method of rolling, folding, and bending the flexible display panel.

The flexible display may include a slideable display, a rollable display, a bendable display, a foldable display, and the like.

The display panel driving unit may drive the pixels P by applying an internal compensation technique.

The display panel driving unit 2A may reproduce the input image on the screen of the display panel 100 by writing the pixel data of the input image to sub-pixels.

The display panel driving unit 2A may include a first data driving unit 110, a second data driving unit 111, a first gate driving unit 120, and a second gate driving unit 123. The display panel driving unit may further include a demultiplexer 112 disposed between data lines DL and the data driving units 110 and 111.

The display panel driving unit 2A may operate in a low-speed driving mode under the control of the timing controller 130. In the low-speed driving mode, the input image is analyzed, and when the input image does not change for a preset period of time, power consumption of the display device may be reduced.

In the low-speed driving mode, when a still image is input for a certain period of time or more, a refresh rate of the pixels P is lowered to control a data writing period of the pixels P to be longer, thereby reducing the power consumption.

The low-speed driving mode is not limited to when a still image is input. For example, when the display device operates in a standby mode or when a user command or an input image is not input to the display panel driving circuit for a predetermined period of time or more, the display panel driving circuit may operate in the low-speed driving mode.

The first data driving unit 110 may sample pixel data to be written to the pixels of the first display area DA from the pixel data received from the timing controller 130. The first data driving unit 110 may convert the pixel data to be written to the pixels into a gamma compensation voltage using a digital-to-analog converter (hereinafter referred to as "DAC") and output a data voltage Vdata.

The data voltage Vdata output from channels of the first data driving unit 110 may be applied to the data lines DL connected to the pixels of the first display area DA through the demultiplexer 112, or may be directly applied to the data lines DL.

The second data driving unit 111 may receive pixel data to be written to the pixels of the second display area CA from the pixel data, which is received from the timing controller 130, as a digital signal. The second data driving unit 111 may convert the pixel data to be written to the pixels of the second display area CA into a gamma compensation voltage using the DAC to output a data voltage Vdata.

The data voltage Vdata output from channels of the second data driving unit 111 may be applied to the data lines DL connected to the pixels of the second display area CA through the demultiplexer 112, or may be directly applied to the data lines DL.

The first data driving unit 110 and the second data driving unit 111 may be one data driving unit that performs the same function, or may be separate driving units each independently driven. As an example, when both the first display area DA and the second display area CA are time-divisionally driven during an image capturing period, the first data driving unit and the second data driving unit may be one driving unit. However, when only the second display area CA is time-divisionally driven, the first data driving unit 110 and the second data driving unit 111 may be separate driving units that operate independently.

Each of the first and second data driving units 110 and 111 may include a voltage dividing circuit that outputs the gamma compensation voltage. The voltage dividing circuit may divide a gamma reference voltage received from the power supply unit 150 to generate a gamma compensation voltage for each grayscale, and provide the gamma compensation voltage to the DAC. The DAC may convert the pixel data into the gamma compensation voltage to output the data voltage Vdata.

The demultiplexer 112 may time-divisionally distribute the data voltage Vdata output through the channels of the data driving units 110 and 111 to the plurality of data lines DL. Due to the demultiplexer 112, the number of the channels of the data driving units 110 and 111 may be reduced. However, the present disclosure is not necessarily limited thereto, and the demultiplexer 112 may be omitted.

The first gate driving unit 120 may be implemented as a gate-in-panel (GIP) circuit formed directly in a bezel area BZ on the display panel 100 together with a TFT array of the pixel array. The first gate driving unit 120 may output a gate signal to gate lines GL connected to the pixels of the first display area DA under the control of the timing controller 130.

The first gate driving unit 120 may shift the gate signal using a shift register to sequentially supply the signals to the gate lines GL connected to the pixels of the first display area DA.

A voltage of the gate signal may swing between a gate-off voltage VGH and a gate-on voltage VGL. The gate signal applied to the pixels of the first display area DA may include a pulse of a scan signal (hereinafter referred to as a "scan pulse") and a pulse of a light emission control signal (hereinafter referred to as an "EM pulse"). The gate lines GL connected to the pixels of the first display area DA may include scan lines to which the scan pulse is applied and EM lines to which the EM pulse is applied.

The first gate driving unit 120 may be disposed in each of left and right bezel areas BZ of the display panel 100 to supply the gate signals to the gate lines GL using a double feeding method.

In the double feeding method, the gate driving units 120 disposed on both bezels of the display panel 100 are synchronized by the timing controller 130, so that the gate signals may be simultaneously applied at both ends of one gate line.

In another embodiment, the first gate driving unit 120 may be disposed on one of the left and right bezels of the display panel 100 to supply the gate signals to the gate lines GL using a single feeding method.

The first gate driving unit 120 may include a first-first gate driving unit 121 and a first-second gate driving unit 122. The first-first gate driving unit 121 may output a scan pulse, shift the scan pulse according to a shift clock, and sequentially supply the scan pulse to the scan lines connected to the pixels of the first display area DA.

The first-second gate driving unit 122 may output an EM pulse, shift the EM pulse according to the shift clock, and sequentially supply the EM pulse to the EM lines connected to the pixels of the first display area DA.

The second gate driving unit 123 may output a gate signal to the gate lines GL connected to the pixels of the second display area CA under the control of the timing controller 130. The second gate driving unit 123 may shift the gate signal using a shift register to sequentially supply the signals to the gate lines GL connected to the pixels of the second display area CA.

A voltage of the gate signal may swing between the gate-off voltage VGH and the gate-on voltage VGL. The gate signal applied to the pixels of the second display area CA may include a scan pulse. The gate lines GL connected to the pixels of the second display area CA may include scan lines to which the scan pulse is applied.

The second gate driving unit 123 may be implemented as a gate in array (GIA) circuit disposed in the second display area CA or disposed in at least one of the bezel areas BZ of the display panel 100. However, the position of the second gate driving unit 123 is not particularly limited.

In addition, a portion of the second gate driving unit 123 may be disposed in the second display area CA, and the remaining circuit configuration of the second gate driving unit 123 may be disposed in the bezel area BZ of the display panel 100. The second gate driving unit 123 may output a scan pulse, shift the scan pulse according to the shift clock, and sequentially supply the scan pulse to the scan lines connected to the pixels of the second display area CA.

The timing controller 130 may receive the pixel data of the input image and a timing signal synchronized with the pixel data from a host system. The timing signal may include a vertical synchronization signal Vsync, a horizontal synchronization signal Hsync, a clock CLK, a data enable signal DE, and the like.

One period of the vertical synchronization signal Vsync is one frame period. One period of each of the horizontal synchronization signal Hsync and the data enable signal DE is one horizontal period 1H. A pulse of the data enable signal DE may be synchronized with one piece of line data to be written to the pixels P of one pixel line. Since a frame period and a horizontal period may be obtained through a method of counting the data enable signal DE, the vertical synchronization signal Vsync and the horizontal synchronization signal Hsync may be omitted.

The timing controller 130 may transmit the pixel data of the input image to the first and second data driving units 110 and 111, and control an operation timing of the display panel driving unit so that the first and second data driving units 110 and 111, the demultiplexer 112, and the first and second gate driving units 120 and 123 are synchronized with each other.

The timing controller 130 may multiply an input frame frequency by i (here, i is a natural number) to control the operation timing of the display panel driving unit 2A at a frame frequency of the input frame frequency x i Hz.

The input frame frequency is 60 Hz for National Television Standards Committee (NTSC) and 50 Hz for Phase-Alternating Line (PAL). In order to lower a refresh rate of the pixels P in the low-speed driving mode, the timing controller 130 may lower the frame frequency into a frequency ranging from 1 Hz to 30 Hz.

The timing controller 130 may generate a data timing control signal for controlling an operation timing of the data driving unit 110, a switch control signal for controlling an operation timing of the demultiplexer 112, and a gate timing control signal for controlling an operation timing of the first gate driving unit 120 on the basis of the timing signals Vsync, Hsync, and DE received from the host system 1A (see FIG. 5).

The gate timing control signal may include a start pulse, a shift clock, a reset signal, an initialization signal, and the like. A voltage level of the gate timing control signal output from the timing controller 130 may be converted into the gate-off voltage VGH/VEH and the gate-on voltage VGL/VEL through a level shifter (omitted from the drawing) and supplied to the first gate driving unit 120.

The level shifter may convert a low-level voltage of the gate timing control signal into the gate-on voltage VGL and convert a high-level voltage of the gate timing control signal into the gate-off voltage VGH.

The power supply unit 150 may include a charge pump, a regulator, a buck converter, a boost converter, a programmable gamma integrated circuit (P-GMA IC), and the like.

The power supply unit 150 may adjust a DC input voltage received from the host system to generate power required for driving the display panel driving unit and the display panel 100.

The power supply unit 150 may output DC voltages such as the gamma reference voltage, the gate-off voltage VGH/VEH, the gate-on voltage VGL/VEL, a pixel driving voltage ELVDD, a low-potential power voltage ELVSS, an initialization voltage Vini, a reference voltage Vref.

The programmable gamma IC may vary the gamma reference voltage according to a register setting value. The gamma reference voltage may be supplied to the data driving unit 110. The gate-off voltage VGH/VEH and the gate-on voltage VGL/VEL may be supplied to the level shifter and the first gate driving unit 120.

The pixel driving voltage ELVDD, the low-potential power voltage ELVSS, the initialization voltage Vini, and the reference voltage Vref may be commonly supplied to the pixel circuits through power lines. The pixel driving voltage ELVDD may be set to a voltage higher than the low-potential power voltage ELVSS, the initialization voltage Vini, and the reference voltage Vref.

In a mobile device or a wearable device, the timing controller 130, the data driving unit 110, and the power supply unit 150 may be integrated into one drive IC (D-IC).

The PPI of the second display area CA is lower than the PPI of the first display area DA. For this reason, when the data voltage Vdata applied to the pixels P of the second display area CA is equal to the data voltage Vdata applied to the pixels P of the first display area DA at the same grayscale, the luminance of the second display area CA may be lower than the luminance of the first display area DA.

In order to compensate for a luminance difference between the first and second display areas DA and CA, the data voltage Vdata output from the second data driving unit 111 may be set to have a larger voltage range than the data voltage Vdata output from the first data driving unit 110. The data voltage Vdata may be determined according to the gamma compensation voltage. Thus, in order to extend the voltage range of the data voltage Vdata, the output voltage range of the programmable gamma IC may be extended.

Further, during time-division driving, the data voltage is not output in some sub-frame sections, and thus the data voltage Vdata may be set to a larger voltage range in the sub-frame section in which the corresponding color data is output to compensate for the data voltage.

FIG. 16 is a view illustrating driving timings during normal driving and time-division driving of the display panel. FIG. 17 is a view illustrating driving timings of the image capturing unit, the first display area, and the second display area. FIG. 18 is a view illustrating a state in which a cathode of the first display area and a cathode of the second display area are separated.

Referring to FIGS. 5 and 16, when the image capturing unit 40 is not driven, the display panel 100 may be driven at a first driving frequency, but when the image capturing unit 40 is driven, the display panel 100 and the image capturing unit 40 may be time-divisionally driven at a second driving frequency lower than the first driving frequency, thereby ensuring a rotation speed margin of the filter module. That is, both the first display area DA and the second display area CA of the display panel 100 may be time-divisionally driven at the second driving frequency.

When a driving signal of the image capturing unit 40 is received, the timing controller 130 of the display device may vary the driving frequency, and the display panel driving unit 2A may operate the display panel 100 according to the varied frequency.

In this case, the second driving frequency may be lower than the first driving frequency, but may be a speed that cannot be recognized by a person. As an example, the first driving frequency may be 60 Hz and the second driving frequency may be 20 Hz, but the present disclosure is not necessarily limited thereto.

Referring to FIGS. 15 and 17, when the image capturing unit 40 is not driven, both the first display area DA and the second display area CA may be driven in a normal mode. However, when the driving signal of the image capturing unit 40 is input, the first display area DA may be driven in the normal mode, but the second display area CA may be field-sequentially driven at a high speed.

That is, in the second display area CA, one frame may be divided into sections of a plurality of sub-frames SF1, SF2, and SF3 to output different color data, and the image capturing unit 40 may receive the different color data for each of the sections of the plurality of sub-frames SF1, SF2, and SF3.

Here, the color data output from the second display area CA may be different from the color data received by the image capturing unit. As an example, in the section of the first sub-frame SF1, the image capturing unit may sense red data and the display panel may output green data and blue data, thereby preventing light outputted from the display panel from being received by the image capturing unit.

The second data driving unit 111 may increase and output the data voltage so that the overall luminance of the second display area CA during the time-division driving is equal to the luminance of the second display area CA in the normal mode. The configuration of independently controlling the data voltage is not particularly limited. As an example, different data voltages may be applied by separating the pixel driving voltage ELVDD or the low-potential power voltage ELVSS. However, the present disclosure is not necessarily limited thereto, and various configurations may all be applied to the method of setting the data voltage differently.

According to the embodiment, a first voltage level applied to the pixels of the second display area CA by the second data driving unit 111 may be greater than a second voltage level applied to the pixels of the first display area DA by the first data driving unit 110.

When operating in the normal mode, since the PPI of the second display area CA is small and thus the luminance is relatively low, a data voltage level may be increased to compensate for this. In addition, in the time-division driving, the data voltage applied to the pixels of the second display area CA may be increased by adding a first voltage increase for compensating for the low luminance due to the small PPI to a second voltage increase for compensating for the decrease in luminance due to the shortened light emission time due to the time-division driving.

According to the embodiment, when the image capturing unit 40 is not driven, the first display area DA and the second display area CA may equally output image data, but when the image capturing unit 40 is driven, only the second display area CA may be time-divisionally driven. In addition, light output from the second display area CA may be independently controlled so as not to be introduced into the image capturing unit, and the luminance of the second display area CA may be independently adjusted.

FIG. 18 is a view illustrating an example in which a cathode of a light-emitting element is separated between a low PPI area and a high PPI area so that an independent low-potential power voltage is applied to pixels for each area.

Referring to FIG. 18, the first display area DA may include a first cathode CAT1. The first cathode CAT1 may be commonly connected to the light-emitting elements (OLEDs) of the pixels disposed in the first display area DA. A first low-potential power voltage ELVSS1 may be applied to the first cathode CAT1.

The second display area CA may include a second cathode CAT2. The second cathode CAT2 may be separated from the first cathode CAT1. Accordingly, the first cathode CAT1 and the second cathode CAT2 may apply low-potential power voltages ELVSS1 and ELVSS2 having different voltage levels to the pixels for each area. Accordingly, the data voltage level applied to the second display area CA may be independently controlled. However, the present disclosure is not necessarily limited thereto, and the data voltage level may also be independently controlled by separating ELVDD.

FIG. 19 illustrates a first modified example of FIG. 17. FIG. 20 illustrates a second modified example of FIG. 17. FIG. 21 illustrates a third modified example of FIG. 17.

Referring to FIG. 19, when the image capturing unit 40 is not driven, the first display area DA and the second display area CA may equally output image data, but when the image capturing unit 40 is driven, both the first display area DA and the second display area CA may be time-divisionally driven. That is, when the image capturing unit is driven, both the first display area DA and the second display area CA may be field-sequentially driven at a high speed.

Referring to FIG. 20, when the driving signal of the image capturing unit 40 is input, the first display area DA may be driven in the normal mode while the second display area CA may be time-divisionally driven.

Here, the second display area CA may operate at a second driving frequency lower than the current driving frequency. As described above, such a configuration may be achieved by separately driving the first gate driving unit and the second gate driving unit.

In the second display area CA, one frame may be divided into sections of a plurality of sub-frames SF1, SF2, and SF3 to output different color data, and the image capturing unit 40 may receive the different color data for each of the sections of the plurality of sub-frames SF1, SF2, and SF3.

Here, the color data output from the second display area CA may be different from the color data received by the image capturing unit. As an example, in the section of a first sub-frame, the image capturing unit may sense red data and the display panel may output green data and blue data.

The second data driving unit 111 may increase and output the data voltage so that the overall luminance of the second display area CA during the time-division driving is equal to the luminance of the first display area DA.

Further, referring to FIG. 21, when the image capturing unit 40 is driven, both the first display area DA and the second display area CA are time-divisionally driven, and the driving frequency is slowly varied to ensure a rotation speed margin of the filter module.

According to an embodiment, the quality of an image captured by a front camera of a full-screen display can be improved.

Effects of the present disclosure will not be limited to the above-mentioned effects and other unmentioned effects will be clearly understood by those skilled in the art from the following claims.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display device comprising:
a display panel including a plurality of pixels; and
an image capturing unit disposed below the plurality of pixels,
wherein, when the image capturing unit is driven, the display panel is time-divisionally driven by dividing one frame into a plurality of sub-frame sections, and
the image capturing unit is synchronized with the display panel to receive different color data for each section of the plurality of sub-frame sections.

2. The display device of claim 1, wherein the display panel includes a first display area having a first pixel density and a second display area having a second pixel density lower than the first pixel density, and
the image capturing unit is disposed below the second display area.

3. The display area of claim 2, wherein when the image capturing unit is driven, the second display area is synchronized with the image capturing unit to be time-divisionally driven.

4. The display area of claim 2, wherein the first display area and the second display area are separately driven by two data driving units.

5. The display area of claim 2, wherein the first display area includes a first cathode commonly connected to light emitting elements of pixels included in the first display area,
wherein the second display area includes a second cathode commonly connected to light emitting elements of pixels included in the second display area, and
wherein the first cathode is separated from the second cathode.

6. The display device of claim 1, wherein in each section of the plurality of sub-frame sections, color data output from the display panel is different from color data received by the image capturing unit.

7. The display device of claim 1, further comprising:
a display panel driving unit configured to drive the display panel; and
an image capturing unit driving unit configured to drive the image capturing unit,
wherein, when the image capturing unit is driven, the display panel driving unit and the image capturing unit driving unit are synchronized with each other to time-divisionally drive each of the display panel and the image capturing unit.

8. The display device of claim 7, wherein the display panel driving unit adjusts a data voltage applied to the pixel during time-division driving to be greater than a data voltage applied to the pixel during normal driving in which the time-division driving is not performed.

9. The display device of claim 2, further comprising a filter module configured to allow light to be selectively incident on the image capturing unit,
wherein the filter module includes a blue filter, a green filter, and a red filter.

10. The display device of claim 9, wherein the filter module allows one of the blue filter, the green filter, and the red filter to be selectively disposed in the second display area for each section of the plurality of sub-frame sections.

11. The display device of claim 1, wherein the plurality of sub-frame sections include a first sub-frame section, a second sub-frame section, and a third sub-frame section,
wherein in the first sub-frame section, the image capturing unit receives blue data, and the display panel outputs green data and red data, in the second sub-frame section, the image capturing unit receives the green data, and the display panel outputs the blue data and the red data, and in the third sub-frame section, the image capturing unit receives the red data, and the display panel outputs the blue data and the green data.

12. The display device of claim 2, wherein, when the image capturing unit is driven, a driving frequency for driving the display panel is varied.

13. The display device of claim 2, wherein when the image capturing unit is driven, the first display area is driven in a normal mode in which time-division driving is not performed, and the second display area is time-divisionally driven.

14. The display device of claim 13, wherein when the image capturing unit is driven, the first display area is driven at a first driving frequency, and the second display area is driven at a second driving frequency different from the first driving frequency.

15. The display device of claim 2, wherein when the image capturing unit is driven, the first display area simultaneously outputs red data, green data, and blue data that constitute an image, and the second display area simultaneously outputs only two pieces of data of the red data, the green data, and the blue data for each section of the plurality of sub-frame sections.

16. The display device of claim 1, wherein the image capturing unit includes a blocking section, in which data is not input, between the plurality of sub-frame sections.

17. A display device comprising:

a display panel including a first display area having a first pixel density and a second display area having a second pixel density lower than the first pixel density;

an image capturing unit disposed below the second display area; and a filter module configured to allow light to be selectively incident on the image capturing unit, wherein the image capturing unit is time-divisionally controlled to receive different color data by the filter module for each time-division section.

18. The display device of claim 17, wherein when the image capturing unit is driven, the display panel is time-divisionally driven by dividing one frame into a plurality of sub-frame sections, and in the plurality of sub-frame sections, color data output from the display panel is different from color data received by the image capturing unit.

19. A display device comprising a first display area having a first pixel density and a second display area having a second pixel density lower than the first pixel density, wherein, the second display area is allowed to be time-divisionally driven by dividing one frame into a plurality of sub-frame sections, and during time division driving, the second display area simultaneously outputs only two pieces of data of red data, green data, and blue data for each section of the plurality of sub-frame sections.

20. The display device of claim 19, wherein the first display area is allowed to be time-divisionally driven by dividing one frame into a plurality of sub-frame sections, and during time division driving, the first display area and the second display area simultaneously output only two pieces of data of red data, green data, and blue data for each section of the plurality of sub-frame sections.

* * * * *